(12) United States Patent (10) Patent No.: US 12,020,305 B2
Singhal et al. (45) Date of Patent: Jun. 25, 2024

(54) QUERY ENGINE FOR EXECUTING CONFIGURATOR SERVICES IN A SELF-DESCRIBING DATA SYSTEM

(71) Applicant: ARAS CORPORATION, Andover, MA (US)

(72) Inventors: Ayla Singhal, Andover, MA (US);
Kevin Gillespie, Andover, MA (US);
Kevin Richard, Andover, MA (US);
Robert McAveney, Boxford, MA (US);
Sergey Murashko, Minsk (BY);
Valentsin Shapavalau, Minsk (BY);
Andrei Samsonau, Minsk (BY)

(73) Assignee: Aras Corporation, Andover, MA (US)

( * ) Notice: Subject to any disclaimer, the term of this patent is extended or adjusted under 35 U.S.C. 154(b) by 0 days.

(21) Appl. No.: 17/652,636

(22) Filed: Feb. 25, 2022

(65) Prior Publication Data

US 2022/0253915 A1 Aug. 11, 2022

Related U.S. Application Data

(63) Continuation-in-part of application No. 16/387,205, filed on Apr. 17, 2019, now Pat. No. 11,645,285.

(60) Provisional application No. 62/663,777, filed on Apr. 27, 2018.

(51) Int. Cl.
*G06F 16/9538* (2019.01)
*G06Q 30/0601* (2023.01)

(52) U.S. Cl.
CPC ..... *G06Q 30/0621* (2013.01); *G06F 16/9538* (2019.01)

(58) Field of Classification Search
None
See application file for complete search history.

(56) References Cited

U.S. PATENT DOCUMENTS

| 7,013,306 | B1 | 3/2006 | Turba et al. |
| 7,089,530 | B1 | 8/2006 | Dardinski et al. |
| 7,584,079 | B2 * | 9/2009 | Lichtenberg ............ G06F 30/15 |
| | | | 707/999.005 |
| 8,375,014 | B1 | 2/2013 | Brocato |
| | | (Continued) | |

OTHER PUBLICATIONS

Pearce et al., "Configuration management through satisfiability", 2016; (Year: 2016).*

*Primary Examiner* — Dawaune A Conyers
(74) *Attorney, Agent, or Firm* — Jonathan H. Harder; Dickinson Wright Pllc

(57) ABSTRACT

A method for operating a product configuration service, wherein the method comprises: receiving a query pertaining to a scope of searching for a configuration of a product; retrieving, based on the query, information from a self-referencing data model that stores the information as items having item types, wherein the information comprises: variables associated with an entity and values for the variables defined by files of the entity, wherein variables are defined by features that are linked to a source of the files, rules that specify compatibility constraints between the variables, and the information is used during runtime and not persisted to memory; generating, based on the rules and the variables, a solution space comprising the values; and presenting the solution space in a user interface of a computing device of a user.

18 Claims, 26 Drawing Sheets

(56) References Cited

U.S. PATENT DOCUMENTS

| | | |
|---|---|---|
| 8,590,011 B1 * | 11/2013 | Legault ................ H04L 63/105 |
| | | 713/166 |
| 9,418,111 B1 | 8/2016 | de Moor |
| 2003/0061238 A1 * | 3/2003 | Atkinson ............... G06Q 30/02 |
| 2003/0167401 A1 | 9/2003 | Murren et al. |
| 2006/0069717 A1 | 3/2006 | Mamou et al. |
| 2006/0206866 A1 | 9/2006 | Eldrige et al. |
| 2006/0259449 A1 | 11/2006 | Betz et al. |
| 2007/0271227 A1 | 11/2007 | Momen-Pour et al. |
| 2013/0060733 A1 | 3/2013 | Wu |
| 2014/0101133 A1 | 4/2014 | Carston et al. |
| 2014/0280314 A1 | 9/2014 | Coleman et al. |
| 2015/0261728 A1 | 9/2015 | Davis |
| 2017/0351683 A1 | 12/2017 | Hurst et al. |

* cited by examiner

FIG. 3

```
<Item type="Part" action="add">
    <item_number>999-888</item_number>
    <description>Some Assy</description>
    <Relationships>
        <Item type="Part BOM" action="add">
            <quantity>10</quantity>
            <related_id>
                <Item type="Part" action="add">
                    <item_number>123-456</item_number>
                    <description>1/4w 10% 10K Resistor</description>
                </Item>
            </related_id>
        </Item>
    </Relationships>
</Item>
```

FIG. 7A

```xml
<?xml version="1.0"?>
<AML>
    <Item action="qry_ExecuteQueryDefinition" type="qry_QueryDefinition">
        <root_query_item_ref_id>part_1</root_query_item_ref_id>
        <name>UseCase_1</name>
        <Relationships>
            <Item type="qry_QueryCondition">
                <condition_xml>
                    <![CDATA[<condition> <eq> <property ref-id="TopPart_id_GUID"/> <property ref-id="PBom_sourceId_GUID"/> </eq> </condition> ]]>
                </condition_xml>
                <ref_id>join_cond_1</ref_id>
            </Item>
            <Item type="qry_QueryCondition">
                <condition_xml>
                    <![CDATA[<condition> <eq> <property ref-id="PBom_relatedId_GUID"/> <property ref-id="RelPart_id_GUID"/> </eq> </condition> ]]>
                </condition_xml>
                <ref_id>join_cond_2</ref_id>
            </Item>
            <Item type="qry_QueryCondition">
                <condition_xml>
                    <![CDATA[<condition> <gt> <property ref-id="PBom_quantity_GUID"/> <constant>5</constant> </gt> </condition> ]]>
                </condition_xml>
                <ref_id>cond_1</ref_id>
            </Item>
            <Item type="qry_QueryItem">
                <alias>TopPart</alias>
                <condition_ref_id/>
                <item_type type="ItemType" name="Part" keyed_name="Part">4F1AC04A2B484F3A8A4E20D863808A88</item_type>
                <ref_id>part_1</ref_id>
                <Relationships>
                    <Item type="qry_QueryItemSelectProperty">
                        <property_ref_id>TopPart_id_GUID</property_ref_id>
                    </Item>
                    <Item type="qry_QueryItemSelectProperty">
                        <property_ref_id>TopPart_itemNumber_GUID</property_ref_id>
                    </Item>
                    <Item type="qry_QueryItemSelectProperty">
                        <property_ref_id>TopPart_createdById_GUID</property_ref_id>
                    </Item>
                    <Item type="qry_QueryItemSortProperty">
                        <property_ref_id>TopPart_name_GUID</property_ref_id>
                        <sort_order>128</sort_order>
                        <sort_order_direction>Ascending</sort_order_direction>
                    </Item>
                </Relationships>
```

```
        </Item>
      ┌ <Item type="qry_QueryItem">
      │    <alias>PBom</alias>
      │    <condition_ref_id>cond_1</condition_ref_id>
715b ─┤    <item_type type="ItemType" name="Part BOM" keyed_name="Part
      │        BOM">5E9C5A12CC58413A8670CF4003C57848</item_type>
      └    <ref_id>part_bom_1</ref_id>
         + <Relationships>
        </Item>
      ┌ <Item type="qry_QueryItem">
      │    <alias>RelPart</alias>
715c ─┤    <condition_ref_id/>
      │    <item_type type="ItemType" name="Part"
      │        keyed_name="Part">4F1AC04A2B484F3ABA4E20DB63808A88</item_type>
      └    <ref_id>part_2</ref_id>
         - <Relationships>
      ┌      - <Item type="qry_QueryItemSelectProperty">
720d ─┤           <property_ref_id>RelPart_itemNumber_GUID</property_ref_id>
      │         </Item>
      └      </Relationships>
        </Item>
      ┌ <Item type="qry_QueryReference">
      │    <child_ref_id>part_bom_1</child_ref_id>
730a ─┤    <condition_ref_id>join_cond_1</condition_ref_id>
      │    <parent_ref_id>part_1</parent_ref_id>
      └    <ref_id>qref_1</ref_id>
        </Item>
      ┌ <Item type="qry_QueryReference">
      │    <child_ref_id>part_2</child_ref_id>
730b ─┤    <condition_ref_id>join_cond_2</condition_ref_id>
      │    <parent_ref_id>part_bom_1</parent_ref_id>
      └    <ref_id>qref_2</ref_id>
        </Item>
     </Relationships>
   </Item>
</AML>
```

FIG. 9

```
<Item type="qry_QueryDefinition" action="qry_ExecuteSimplifiedQueryDefinition">
  <Parameters>
    <parameter name="@PartNumber" type="string" value="IN-00001" />    ⎫ 905
  </Parameters>
  <Relationships>                                                      907
    <Item type="Part" qb:alias="Part" qb:select="id, item_number">
      <qb:filter>
        <eq>
          <property qb:alias="Part.item_number" />                      ⎫ 910
          <parameter name="@PartNumber" />
        </eq>
      </qb:filter>
    </Item>
  </Relationships>
</Item>
```

```
                                                                    ┌─1000
<Item type="qry_QueryDefinition"
action="qry_ExecuteSimplifiedQueryDefinition">
   <Parameters>
1005   <parameter name="@Levels" type="integer" value="2" />
   </Parameters>
   <Relationships>
     <Item type="Part" qb:alias="Part" qb:select="id, item_number">
       <Relationships>
         <Item type="Part BOM" qb:alias="Part BOM" qb:select="id">
           <qb:fetch>
             <if>
               <condition>
                 <match-path>
                   <parameter name="@ExecutionPath" />
                   <format-string format="QR1/(QR2/QR1){#0}/">
                     <argument-value key="#0">
1010                   <parameter name="@Levels" />
                     </argument-value>
                   </format-string>
                 </match-path>
               </condition>
               <then>0</then>
             </if>
           </qb:fetch>
         </Item>
       </Relationships>
     </Item>
   </Relationships>
</Item>
```

```
                    <item type="TopPart">
                      <created_by_id keyed_name="Innovator Admin">30B991F927274FA38296551F50C99472E</created_by_id>
1205d  ⎨              <id keyed_name="part_5">84EDD828494960B6F86FB8A48E0F6D</id>
                      <item_number>part_5</item_number>
                    </item>
                    <item type="TopPart">
                      <created_by_id keyed_name="Innovator Admin">30B991F927274FA38296551F50C99472E</created_by_id>
1205e  ⎨              <id keyed_name="part_6">ABFD8D198363AE59A2E66CF1C1610E4D</id>
                      <item_number>part_6</item_number>
                    </item>
                    <item type="TopPart">
                      <created_by_id keyed_name="Innovator Admin">30B991F927274FA38296551F50C99472E</created_by_id>
1205f  ⎨              <id keyed_name="part_7">D68CFA6B88424AFD98849DF99619DD35</id>
                      <item_number>part_7</item_number>
                    </item>
                    <item type="TopPart">
                      <created_by_id keyed_name="Innovator Admin">30B991F927274FA38296551F50C99472E</created_by_id>
1205g  ⎨              <id keyed_name="part_8">65466SD4E35143F1A372B4B477D6A656</id>
                      <item_number>part_8</item_number>
                    </item>
                  </Result>
                </SOAP-ENV:Body>
              </SOAP-ENV:Envelope>
```

```
<AML>
<Item alias="Part">
    <id>ROOT_PART_ID</id>
    <Relationships>
        <Item alias="Part BOM">
            <id>PB_1</id>
            <Relationships>
                <Item alias="Part">
                    <id>REUSED_PART_ID</id>
                </Item>
            </Relationships>
        </Item>
        <Item alias="Part BOM">
            <id>PB_2</id>
            <Relationships>
                <Item alias="Part">
                    <id>REUSED_PART_ID</id>
                </Item>
            </Relationships>
        </Item>
        <Item alias="Part BOM">
            <id>PB_3</id>
            <Relationships>
                <Item alias="Part">
                    <id>NON_REUSED_PART_ID</id>
                    <Relationships>
                        <Item alias="Part BOM">
                            <id>PB_4</id>
                            <Relationships>
                                <Item alias="Part">
                                    <id>REUSED_PART_ID</id>
                                    <Relationships>
                                        <Item alias="Part Document">
                                            <id>PD_1</id>
                                        </Item>
                                    </Relationships>
                                </Item>
                            </Relationships>
                        </Item>
                    </Relationships>
                </Item>
            </Relationships>
        </Item>
    </Relationships>
</Item>
</AML>
```

```
<Result>
    <Item alias="Part">
        <id>ROOT_PART_ID</id>
        <QB_flat_id>0</QB_flat_id>
        <QB_flat_parent_ids></QB_flat_parent_ids>
    </Item>
    <Item alias="Part BOM">
        <id>PB_1</id>
        <QB_flat_id>1</QB_flat_id>
        <QB_flat_parent_ids>0</QB_flat_parent_ids>
    </Item>
    <Item alias="Part BOM">
        <id>PB_2</id>
        <QB_flat_id>2</QB_flat_id>
        <QB_flat_parent_ids>0</QB_flat_parent_ids>
    </Item>
    <Item alias="Part BOM">
        <id>PB_3</id>
        <QB_flat_id>3</QB_flat_id>
        <QB_flat_parent_ids>0</QB_flat_parent_ids>
    </Item>
    <Item alias="Part">
        <id>REUSED_PART_ID</id>
        <QB_flat_id>4</QB_flat_id>
        <QB_flat_parent_ids>1,2</QB_flat_parent_ids>
    </Item>
    <Item alias="Part">
        <id>NON_REUSED_PART_ID</id>
        <QB_flat_id>5</QB_flat_id>
        <QB_flat_parent_ids>3</QB_flat_parent_ids>
    </Item>
    <Item alias="Part BOM">
        <id>PB_4</id>
        <QB_flat_id>6</QB_flat_id>
        <QB_flat_parent_ids>5</QB_flat_parent_ids>
    </Item>
    <Item alias="Part">
        <id>REUSED_PART_ID</id>
        <QB_flat_id>7</QB_flat_id>
        <QB_flat_parent_ids>6</QB_flat_parent_ids>
    </Item>
    <Item alias="Part Document">
        <id>PD_1</id>
        <QB_flat_id>8</QB_flat_id>
        <QB_flat_parent_ids>7</QB_flat_parent_ids>
    </Item>
</Result>
```

FIG. 21

```
<implication>
  <condition>
    <eq>
      <variable id="item_id_bicycletype" />
      <named-constant id="item_id_Mountain" />
    </eq>
  </condition>
  <consequence>
    <eq>
      <variable id="item_id_material" />
      <named-constant id="item_id_AluminumAlloy" />
    </eq>
  </consequence>
</implication>
```

```xml
<?xml version="1.0"?>
<Item id="0089CDF2BD3C44288B9646A88EC10A54" type="Scope">
    <name>Rear Derailleur</name>
    <Relationships>
        <Item id="199DC979D2874964BDA9871CBA809E2D" type="Variable">
            <id>199DC979D2874964BDA9871CBA809E2D</id>
            <name>Derailleur Material</name>
            <Relationships>
                <Item id="D1AEA4A661FF46B2A780A8CC8D2AC81A" type="NamedConstant">
                    <id>01AEA4A661FF46B2A780A8CC8D2AC81A</id>
                    <string_value>Aluminum</string_value>
                    <name>Aluminum</name>
                </Item>
                <Item id="30D5C2027A6846F885A0CED29589C6E9" type="NamedConstant">
                    <id>30D5C2027A6846F885A0CED29589C6E9</id>
                    <string_value>Carbon Fiber</string_value>
                    <name>Carbon Fiber</name>
                </Item>
            </Relationships>
        </Item>
        <Item id="AB33ADB780C04772B27FFB197021CDFD" type="Variable">
            <id>AB33ADB780C04772B27FFB197021CDFD</id>
            <name>Cogs Combinations</name>
            <Relationships>
                <Item id="D4F1CCA2E2EC4DAB8C05CB99C5AA2949" type="NamedConstant">
                    <id>D4F1CCA2E2EC4DAB8C05CB99C5AA2949</id>
                    <string_value>10-42</string_value>
                    <name>10-42</name>
                </Item>
                <Item id="A1F393ED0634411386A3D5B671888467" type="NamedConstant">
                    <id>A1F393ED0634411386A3D5B671888467</id>
                    <string_value>10-50</string_value>
                    <name>10-50</name>
                </Item>
                <Item id="D7D1EAB7BCEF4E549012F45FB13C6A60" type="NamedConstant">
                    <id>07D1EAB7BCEF4E549012F45FB13C6A60</id>
                    <string_value>11-25</string_value>
                    <name>11-25</name>
                </Item>
                <Item id="30548FF262994EEBBCFB2BA7C2B02853" type="NamedConstant">
                    <id>30548FF262994EEBBCFB2BA7C2B02853</id>
                    <string_value>11-28</string_value>
                    <name>11-28</name>
                </Item>
                <Item id="4D78EE7664724768A345B4F82B3EAFBE" type="NamedConstant">
                    <id>4D78EE7664724768A345B4F82B3EAFBE</id>
                    <string_value>11-30</string_value>
                    <name>11-30</name>
                </Item>
```

```xml
<item id="31DE2C9D07204409DBDBA2DD843C8C8D2" type="Rule">                                    ←2200
  <id>31DE2C9D7204409DBDBA2DD843C8D2</id>
  <name is_null="I"> </name>
  <definition><expression><IMPLICATION><CONDITION><EQ><variable id="413F3E8FC699402F915CD089CB730477" /><named-constant
    id="A9820362CC694EB2871DDCBACFE7A0F3" /></EQ></CONDITION><CONSEQUENCE><OR><EQ><variable
    id="A90203G2CC694EB2871DDCBACFE7A0F3" /><named-constant id="A1F393E00634411386A3DS8671008467" /></EQ><EQ><variable
    id="A90203G2CC694EB2871DDCBACFE7A0F3" /><named-constant id="D4F1CCA2E2EC4DA0805C899CSAA2949" /></EQ><EQ><variable
    id="A90203G2CC694EB2871DDCBACFE7A0F3" /><named-constant id="DE53DE3ADA99459E889C82004FC55CC8" /></EQ><EQ><variable
    id="A90203G2CC694EB2871DDCBACFE7A0F3" /><named-constant id="6A0805F53S0246606F2AC8B144A36C14" /></EQ><EQ><variable
    id="A90203G2CC694EB2871DDCBACFE7A0F3" /><named-constant
    id="4FC26088F3794DF98FF898F1E40AS066" /></EQ></OR></CONSEQUENCE></IMPLICATION></expression></definition>
</Item>
<Item id="4842583287314DA2A7E65AGA0881EC49" type="Rule">
  <id>4842583287314DA2A7E65A6A0061EC49</id>
  <name is_nulls"1"></name>
  <definition><expression><IMPLICATION><CONDITION><EQ><variable id="S3005649877549CDBAECS6960AA0FAF8"/ /><named constant
    id="6D433897A17E44408D6CE1AE00396EDF" /></EQ></CONDITION><CONSEQUENCE><EQ><variable
    id="199DC979D2674964BDA071CBAS09E2D"" /><named-constant
    id="30D5C2027A6846F885A0CED29589C6E9" /></EQ></OR></CONSEQUENCE></IMPLICATION></expression></definition>
</Item>
<Item id="67B1603C056F41C9ADCA0097CD1BB09D" type="Rule">
  <id>="67B1603C056F41C9ADCA0097CD1BB09D</id>
  <name is_nulls"1"></name>
  <definition><expression><IMPLICATION><CONDITION><EQ><variable id="S3005649877549CDBAECS6960AA0FAF8"/ /><named constant
    id="BB931A8CE66D4757B52A98847EFAC364" /></EQ></CONDITION><CONSEQUENCE><EQ><variable
    id="199DC979D2674964BDA071CBAS09E2D"" /><named-constant
    id="D1AEA4A66A1FF46B2A7B0A8CC602AC81A" /></EQ></OR></CONSEQUENCE></IMPLICATION></expression></definition>
</Item>
<Item id="8FS10A29FFA644F6606FC8070056940E" type="Rule">
  <id>8FS10A29FFA644F6606FC8070056940E</id>
  <name is_nulls"1"></name>
  <definition><expression><IMPLICATION><CONDITION><EQ><variable id="413F38FC699482F91SAD089CB730477"/ /><named constant
    id="091AE33FB2468426F913809646OD4DO8F" /></EQ></CONDITION><CONSEQUENCE><EQ><variable
    id="AB33ADB780C04772B27FFB197021CDFD" /><named-constant id="30548FF262994EEBBCF826A7C802853" /><EQ><EQ><variable
    id="AB33ADB780C04772B27FFB197021CDFD" /><named-constant id="4078EE7664724768A345B4F8263AFBE" /><EQ><EQ><variable
    id="AB33ADB780C04772B27FFB197021CDFD" /><named-constant id="07D1EA876C84ES49012F4SC013CA60" /><EQ><EQ><variable
    id="AB33ADB780C04772B27FFB197021CDFD" /><named-constant id="0ES30E3ADA99459E889C82004FC55CC8" /><EQ><EQ><variable
    id="AB33ADB780C04772B27FFB197021CDFD" /><named-constant
    id="IA0E18DB32A64AS49AD9E4788FD00804" /></EQ></OR></CONSEQUENCE></IMPLICATION></expression></definition>
</Item>
<Item id="ESC7DS285C5D475A9CS40BBECAGEAE9" type="Rule">
  <id>ESC7DS285C5D475A9CS40BBECAGEAE9</id>
  <name is_nulls"1"></name>
  <definition><expression><IMPLICATION><CONDITION><EQ><variable id="S3005649877549CDBAECS6960AA0FAF8"/ /><named constant
    id="ZEE68648D04C4D85A9SF46B65836BESF" /></EQ></CONDITION><CONSEQUENCE><EQ><variable
    id="199DC979D2674964BDA071CBAS09E2D"" /><named-constant
    id="01AE499AS661FF46B2A700A9CC8D2AC81A" /></EQ></OR></CONSEQUENCE></IMPLICATION></expression></definition>
</Item>
</Relationships>
</Item>
```

FIG. 23

QUERY ENGINE FOR EXECUTING CONFIGURATOR SERVICES IN A SELF-DESCRIBING DATA SYSTEM

CROSS-REFERENCE TO RELATED APPLICATIONS

This application is a continuation-in-part of U.S. application Ser. No. 16/387,205 filed Apr. 17, 2019 titled "Query Engine for Recursive Searches in a Self-Describing Data System," which claims the benefit of U.S. Provisional Application Ser. No. 62/663,777 filed Apr. 27, 2018 titled "Query Engine for Recursive Searches in a Self-Describing Data System." All applications are incorporated by reference herein as if reproduced in full below.

TECHNICAL FIELD

This disclosure relates generally to search technology. More specifically, this disclosure relates to a query engine for executing configurator services in a self-describing data system.

BACKGROUND

Rapid technological advances and high customer expectations have driven entities to build highly configurable products with an increasing number of product features and options in all domains of the product. The technical challenges associated with determining combinations of parts (items) for an automobile manufacturer includes, without limitation, solving variability problems. However, there may be thousands, millions, and/or billions of parts to search and/or combinations of those parts.

Implementing a search, or query functionality on data expressed in certain markup languages and stored in a database, in particular, a relational database, such as a .SQL server database include, without limitation, difficulty in formulating and executing recursive search queries as well as searching across a dynamic data model. Specifically, recursive searches of relational databases require iterative and repetitive reformulation of the search query. Further, certain markup languages do not support query functionality over across dynamic data models, as changes to the data model will block the execution of the search, typically resulting in an error message indicating that the database schema is different than an expected schema. Efficiently generating an answer to a query for certain items may provide technical challenges.

SUMMARY

This disclosure provides a query engine for recursive searches in a self-describing data system.

In a first embodiment, a method for operating a product configurator service may include receiving an inquiry pertaining to a scope of searching for a configuration of a product. The method may include retrieving, based on the inquiry, information from a self-referencing data model that stores the information as one or more items having one or more item types, wherein the information includes one or more variables associated with an entity and values for the one or more variables defined by one or more files of the entity. The variables are defined by one or more features that are linked to a source of the one or more files, one or more rules that specify compatibility constraints between the one or more variables, and the information is used during runtime and not persisted to memory. The method may include generating, based on the one or more rules and the one or more variables, a solution space comprising the one or more values, and presenting the solution space in a user interface of a computing device of a user.

In some embodiments, a system may include a memory device storing instructions and a processing communicatively coupled to the memory device. The processing device may execute the instructions to perform any operation of any method discussed herein.

In some embodiments, a tangible, non-transitory medium stores instructions that, when executed, cause a processing device to perform any operation of any method discussed herein.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example of a configuration document for an item according to certain embodiments of this disclosure;

FIGS. 7A and 7B illustrate an example of a configuration document setting forth the configuration of a query based on a self-describing data model according to certain embodiments of this disclosure;

FIG. 9 illustrates an example of a query configuration document comprising an instance of an item belonging to the query parameter item type which provides a user-defined filter on the query response data set;

FIG. 10 illustrates an embodiment of a query configuration document comprising an instance of an item belonging to the query parameter item type;

FIGS. 12A and 12B illustrate an example of a markup language document comprising query results obtained and outputted according to various embodiments of this disclosure;

FIGS. 14A and 14B illustrate query results outputted according to embodiments of this disclosure;

FIG. 21 illustrates a free-form Boolean expression language according to embodiments of this disclosure; and FIGS. 22-23 illustrate an example extensible markup language output of a scope item according to embodiments of this disclosure.

DETAILED DESCRIPTION

FIGS. 1 through 23, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
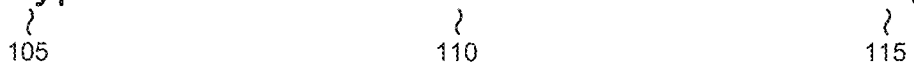
FIG. 1 illustrates an example of a tag creating an instance of an item in a self describing data system according to various embodiments of this disclosure.

FIG. 1 illustrates an example of an <item> tag 100 defining an instance of an item in a self-describing data system according to various embodiments of this disclosure.

According to certain embodiments, the foundational element of a self-describing data system is an item, instances of which may be maintained in persistent storage in a relational database. According to certain embodiments, the configuration and properties of an item may be expressed in a markup language, such as extensible markup language (XML), or Aras Markup Language (AML), which, as described in greater detail herein, follows a repeating "/Item/Relationships/Item/Relationships" pattern to describe item configurations.

Further, in the non-limiting example of FIG. 1, <item> tag 100 defines an instance of an item, which is in turn, an instance of an ItemType, which is itself an item. In this way, the instance of an item defined by <item> tag 100 belongs to a self-describing data system. Further, in some embodiments each ItemType has a relational table in the database, whose columns map to the property names of the ItemType.

According to various embodiments, the instance of the item defined by <item> tag 100 comprises three principal attributes, a type 105, an ID 110 and an action 115. It should be noted that the following three attributes are not the only attributes which can be applied to an item.

In the non-limiting example shown in FIG. 1, type 105 comprises an ItemType name for the instance of the item defined by <item> tag 100. According to certain embodiments, type 105 expresses an ItemType name for the item defined by <item> tag 100. In the non-limiting example of FIG. 1, the name of the item type is the string "Part." According to various embodiments, the namespace for the "type" attribute is extensible and can be dynamically changed, as new names for ItemTypes become necessary. For example, in some embodiments, the item defined by <item> tag 100 may be a piece of data associated with a manufacturing process. In such cases, additional names for ItemTypes, such as "BOM" (Bill of Materials) may become necessary.

According to various embodiments, ID 110 comprises a unique identifier for the instance of an item created by <item> tag 100. In the non-limiting example of FIG. 1, ID 110 comprises the string "ABCDEF012345." According to certain embodiments, ID 110 provides, without limitation, a primary key for the instance of the item for the purposes of providing query results.

In some embodiments, action 115 comprises a method to be applied to the instance of an item defined by <item> tag 100. In the non-limiting example of FIG. 1, the method specified by action 115 is a "get." The instance of an item type defined by <item> tag 100 may, in some embodiments, include one or more Relationship tags, from which a query may be constructed. According to various embodiments, the methods specified by action 115 may be implemented by an API, for example, an API implementing the Aras Innovator Object Model or Item Object Model.

Figure 2:
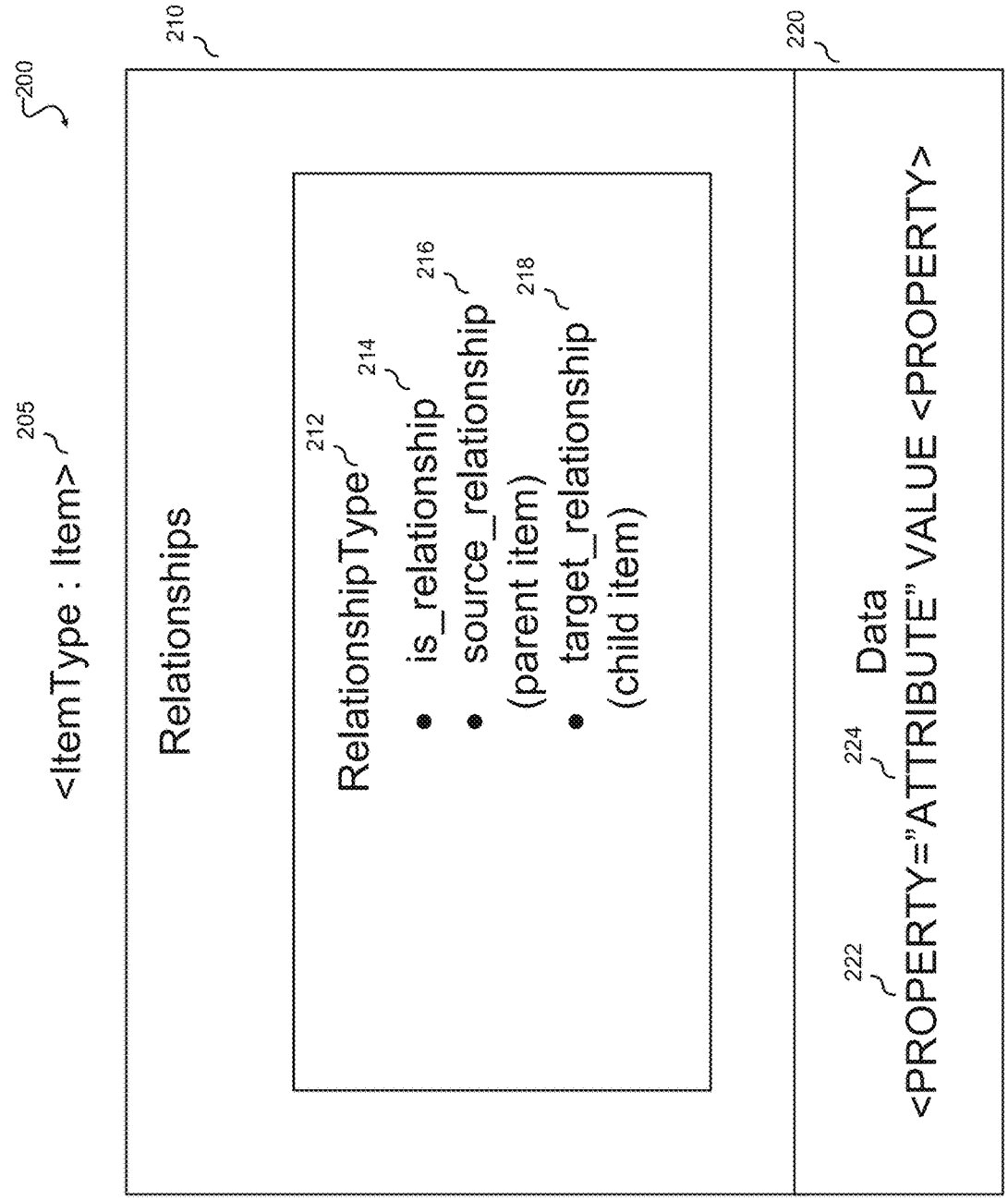
FIG. 2 illustrates, at a structural level aspects of the configuration of an item in a self-describing data system according to various embodiments of this disclosure.

FIG. 2 illustrates, at a structural level, aspects of the configuration 200 of an item in a self-describing data system according to various embodiments of this disclosure.

Referring to the non-limiting example of FIG. 2, the item described by configuration 200 may be initially defined by an <item> tag 205, which according to various embodiments, embodies the syntax and three principal attributes of <item> tag 100 shown in FIG. 1.

According to certain embodiments, the configuration 200 of an item may be expressed as a markup language document (for example, an AML document). In some embodiments, item 200's configuration may be expressed through an "/Item/Relationships/Item/Relationships" pattern in an AML document. Further, the document expressing the configuration 200 of the item may contain data 220 (which are themselves, items), structure or relationships 210 (which are hierarchical items) and logic, which, as shown in the example of FIG. 1, may be expressed through an action attribute (for example, action 115 shown in FIG. 1) of each item.

In the non-limiting example of FIG. 2, relationships 210 comprise hierarchical items. According to certain embodiments, an item's relationship to one or more other items may be expressed through a RelationshipType item 212. In some embodiments, wherein the document setting forth an item's configuration is written in AML, an instance of a RelationshipType item may be defined by using the <Relationships> tag, which is a container tag holding a set of relationship items.

As shown in FIG. 2, according to certain embodiments, the set of relationship items may comprise one or more of the following three properties, an is_relationship 214, a source_relationship 216 and a target_relationship 218.

In some embodiments, when the RelationshipType 212 is created, is_relationship 214 is also created. Is_relationship 214 comprises an item, and its id is the value of the relationship_id property of RelationshipType 212. As such, is_relationship 214 operates to provide an ItemType pairing to RelationshipType 212, and to define a RelationshipType rule and an ItemType for storing the source_relationship 216 and target_relationship 218 properties of the RelationshipType item 212.

According to certain embodiments, source_relationship 216 is a property of RelationshipType 212 which comprises a link pointing to a child item. Similarly, target_relationship 218 is a property of RelationshipType 212, which comprises a link to a child item.

As shown in the non-limiting example of FIG. 2, the configuration 200 of an item may further comprise data 220 expressed as values of properties, wherein the properties may further be specified by attributes.

According to certain embodiments, a property 222 defines data for an item. Examples of properties may include, for example, a cost for an item, which could be expressed in AML or XML in the form: "<cost>232.13</cost>" indicating that a particular item has a cost value of "232.13" units.

According to certain embodiments, items of data for an item may be further specified with an attribute 224, which may be analogized as metadata for the item or property, and controlling logic and methods associated with the item. For example, an attribute may define a conditional, producing an AML or XML expression of the form "<cost condition="between">10.00 and 50.00</cost>" In this example, the property "cost" is further specified through the "between" attribute for which the values 10.00 and 50.00 are specified.

According to certain embodiments, the configuration 200 for an item may further include history data for the item, showing some or all of the previous configurations of the item.

FIG. 3 illustrates an example of a configuration document 300 for an item according to certain embodiments of this disclosure. As shown in the non-limiting example of FIG. 3, an instance of an ItemType is declared through an initial <item> tag 305, which specifies that this instance of an item is of the "Part" type and is associated with an "add" method.

The properties 310 of the item are set forth, and include an "item_number" value (which, according to certain embodiments, may function as a unique identifier of the instance of the item) and a "description" value, which, in this case is "Some Assy" (an abbreviation of "some assembly.")

Container tag 315 specifies that the item has relationships, including a first relationship 320 with item indicating an "add" method with an item of the type "Part BOM." Item configuration 300 further specifies a "related_id" (e.g., child relationship between the "Part BOM" item and a child "part" item 325. Thus, by applying the "/Item/Relationships/Item/Relationships" pattern, a part-to-part BOM relationship may be described.

Figure 4:
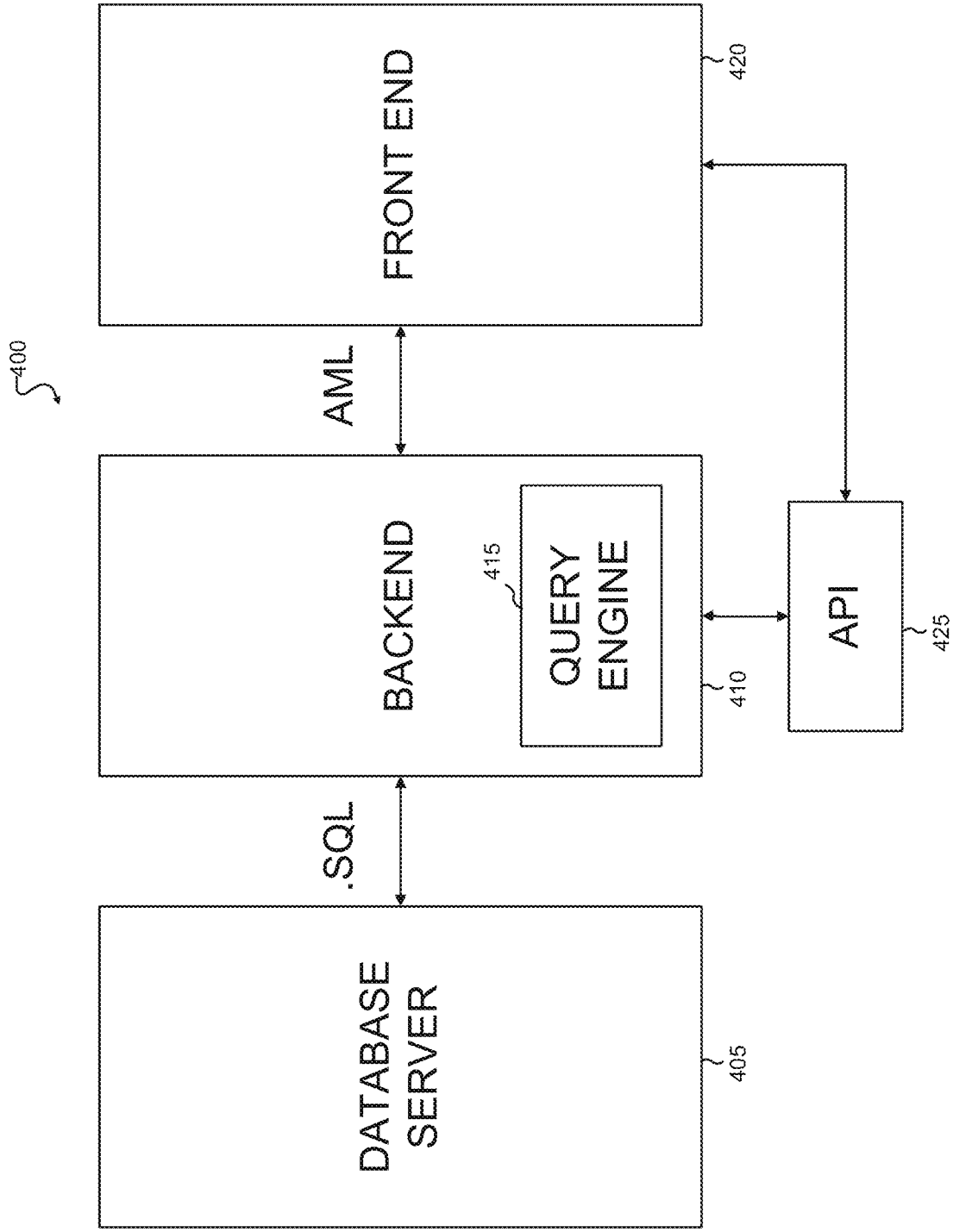
FIG. 4 illustrates an example of a system architecture for implementing a query engine for performing recursive searches in a self-describing data system according to various embodiments of this disclosure.

FIG. 4 illustrates an example of a system architecture 400 for implementing a query engine for performing recursive searches in a self-describing data system according to certain embodiments of this disclosure. In the non-limiting example of FIG. 4, network architecture comprises a database server 405, a backend server 410 implementing query engine 415, and a front end 420.

According to certain embodiments, database server 405 is a server hosting data and implementing one or more database applications supporting query functionalities. Database server 405 is generally platform-agnostic and may host data in a number of known database formats, including a relational database format (for example, by running an instance of .SQL server) or as a columnar database format. In the non-limiting example of FIG. 4, database server 405 is communicatively connected to backend 410. In some embodiments, this connection is provided over a network link, and in some other embodiments, backend 410 and database server 405 may be embodied on the same piece of hardware. Skilled artisans will appreciate that embodiments according to this disclosure may be implemented on a variety of hardware platforms.

According to certain embodiments, database server 405 is configured to receive queries expressed as statements in a domain-specific language (for example, structured query language), and return results from the database hosted on database server 405.

In some embodiments, backend 410 includes one or more processing devices coupled to one or more memory devices storing instructions. The instructions may implement any operation of any method described herein. The one or more processing devices may execute the instructions to perform the operations.

In some embodiments, backend 410 is communicatively coupled to one or more application programming interfaces (APIs) 425 via a network link. The APIs 425 may perform one or more of the operations of the methods described herein. Example operations performed by the APIs 425 may include validating variability definitions, solving variability problems to find a list of valid option items (e.g., parts), obtaining reasons for invalid options, and so forth. Although depicted separate from the backend 410, in some embodiments the APIs 425 may be hosted by the backend 410 and executing on the backend 410. In some embodiments, the APIs 425 may be implemented in instructions and executed by one or more processing devices. In some embodiments the APIs 425 may be executed by one or more servers separate from and different than the backend 410. Further, the one or more APIs 425 may be communicatively coupled to the front end 420 such that a user using the front end 420 can interact with the APIs 425.

According to certain embodiments, backend 410 comprises a server or other computer configured to implement a query engine 415 configured to receive, from front end 420 query requests expressed in the syntax of a self-describing data system (for example, AML). As noted elsewhere, embodiments according to this disclosure are platform-agnostic and may be practiced across a wide range of hardware configurations and development environments. In some embodiments, query engine 415 may be implemented as an ASP.NET web service.

In the non-limiting example of FIG. 4, front end 420 is communicatively connected (for example, via a network or being embodied on the same piece of hardware) to backend 410. According to certain embodiments, front end 420 comprises a web client of a web service provided by backend 410, and provides a user interface (UI) through which queries can be input and query outputs displayed as a user. In certain embodiments, front end 420 may be constructed using modules from the HTML 5 DOJO toolkit. According to certain further embodiments, front end 420 may provide an interface through which users can configure parameters of queries and set permissions for queries. In some embodiments, the front end 420 may be a computing device including one or more processing devices that execute instructions stored on one or more memory devices. The front end 420 may execute a web client of a web service received from backend 410.

Figure 5:
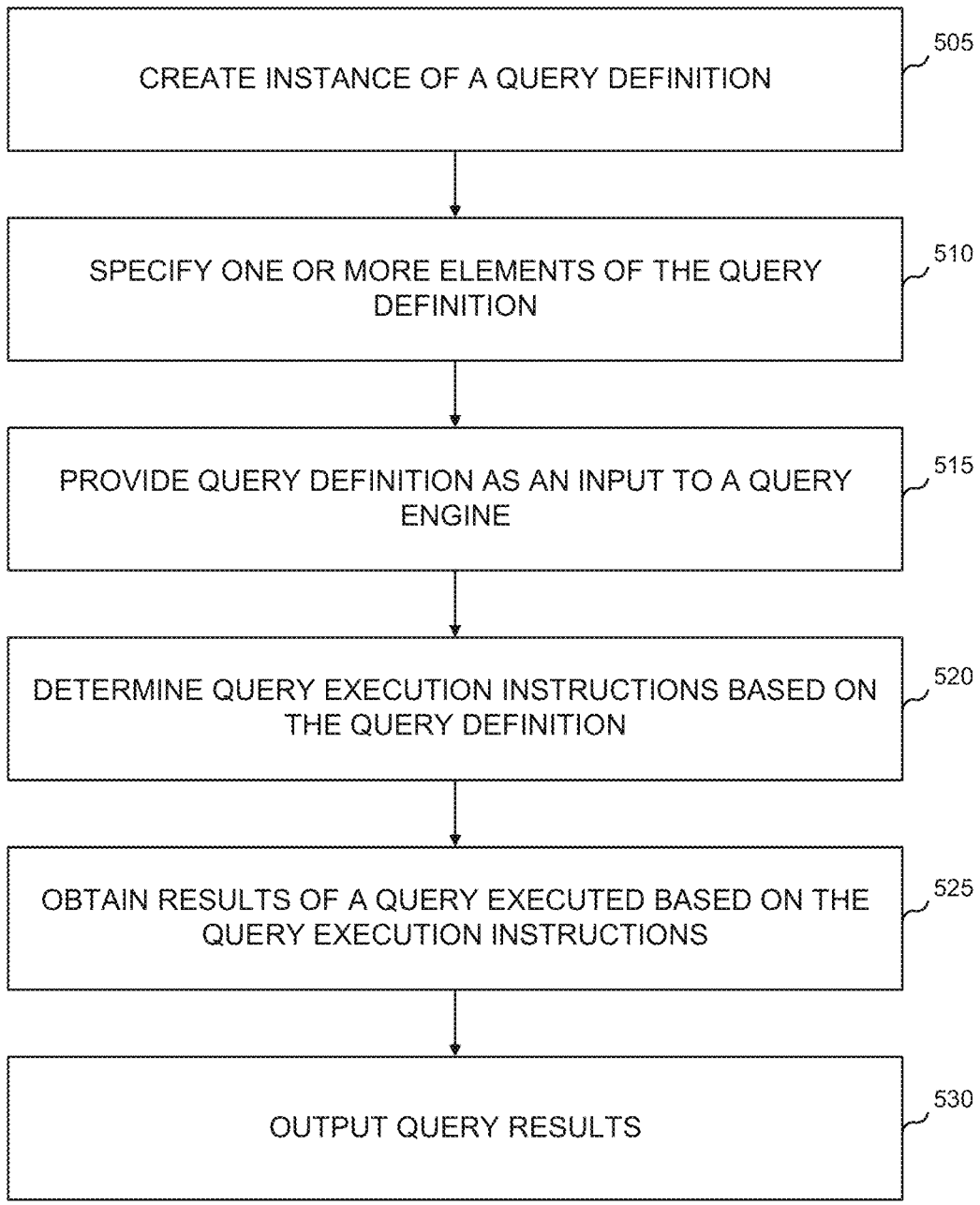
FIG. 5 illustrates operations of a query engine in one embodiment of a method for performing recursive searches in a self-describing data system.

FIG. 5 illustrates operations of a query engine in an example of a method 500 for performing recursive searches in a self-describing data system according to embodiments of this disclosure.

According to the non-limiting example of FIG. 5, method 500 includes operation 505, wherein the query engine creates an instance of a query definition. As discussed elsewhere in this disclosure, certain embodiments according to this disclosure utilize a self-describing data system, wherein the fundamental element of the data system is the item, which is an instance of an ItemType, which is, in turn, itself an item. Further, in certain self-describing data systems according to this disclosure, the configuration of items may be expressed through an "/Item/Relationships/Item/Relationships" pattern.

In some embodiments, a query definition is an item, and creating an instance of a query definition at operation 505 comprises beginning a markup language document (for example, an AML document) defining the configuration of the query definition. Further, a query definition may define the set of data (otherwise known as a domain) which a user is interested in seeing, and which can be collected across one or more different items types and/or relationships using user specified rules for filtering. Because a query definition defines the domain of a query, it may also be utilized to implement domain-based access controls to data items within the data structure.

According to certain embodiments, the AML document defining the configuration of the query begins with an instance of an <item> tag, an example of which is provided below:

<Item     action="qry_Execute     QueryDefinition" type="qry_QueryDefinition">

As shown above, according to some embodiments, an <item> tag creating an instance of a query definition specifies, at a minimum, a type of the instance of the query, which in this case, is a query definition (specified as "qry_QueryDefinition"), and a method, or action associated with the item, which in this case, is an instruction to execute a query, (specified as "qry_Execute Query Definition"). In some embodiments, the <item> tag creating the instance of the query definition item may further comprise a unique ID for the item, which in certain embodiments, may be advantageous if queries or query histories are stored in the data structure.

As shown in the non-limiting example of FIG. 5, method 500 includes operation 510, wherein the query builder, in response to a user input, specifies one or more elements of the query definition. According to certain embodiments, the one or more specified elements of the query definition may be specified as relationships, properties or attributes within the document providing the configuration of the query definition. Specifically, the one or more elements may be specified through additional items defining relationships or properties, including, without limitation, query items, query item selection properties, query item sort properties, query item available properties, query condition items and query reference items.

According to certain embodiments, method 500 includes operation 515, wherein the query definition is provided to a query engine. According to some embodiments, operations 505 and/or 510 may variously be performed at a front end client (for example, front end 420 shown in FIG. 4). According to other embodiments, operations 505 and/or 510 may be performed at the back end or programmatically at the query engine itself. According to certain embodiments, the query engine (for example, query engine 415 in FIG. 4) facilitates translating commands from a front end into query definitions, which are then converted into execution instructions to be passed to a database server (for example, database server 405 in FIG. 4). The query engine may further facilitate the construction of query definitions, and the provision of query results from the database server to the front end.

In some embodiments, method 500 also includes operation 520, wherein the query engine determines query execution instructions based on the received query definition. In the non-limiting example of FIG. 5, operation 520 comprises reading the query definition and translating it into a series of statements in the native language of the database server (for example, .SQL) and properly handling parameters defined within the query definition. As will be discussed further in this disclosure, as part of operation 520, the query engine may further specify an execution path for the query, as well as, where appropriate, recursion depths for recursive queries. In certain embodiments, the query execution instructions based on the query definition specify a recursive, level-by-level search of the data.

Additionally, in the non-limiting example of FIG. 5, the query execution instructions determined at operation 520 may be required to satisfy certain operational constraints, including without limitation, the ability to query a recursive structure, wherein a top level item is filtered by condition, while items from other levels are not filtered. Further, according to certain embodiments, querying a recursive structure must be performed without adding a "pseudo" top level item. Additionally, in certain embodiments, the execution instructions must enable a query of a recursive structure, wherein some intermediate level is filtered by a condition. Additionally, in some still further embodiments, the query execution instructions must enable limiting the depth of the retrieved structure, without modification of a recursive query topology.

According to various embodiments, at operation 525, the query engine obtains the results of a query executed based on the query execution instructions. According to certain embodiments, the results obtained at operation 525 may comprise generally unformatted data, and the query engine may assemble a response containing the results of the query.

In some embodiments, at operation 530, the query engine outputs the assembled query results. According to certain embodiments, operation 530 comprises returning the query response back to a user or application from which the request for a query was received (for example, front end 420 in FIG. 4). According to certain embodiments, the query results output at operation 530 may comprise a markup language document (for example, a document in XML, AML or some other extensible markup language dialect). According to other embodiments, at operation 530, the query engine may output query results as a flat output, a tree graph view or a graph visualization.

Figure 6:
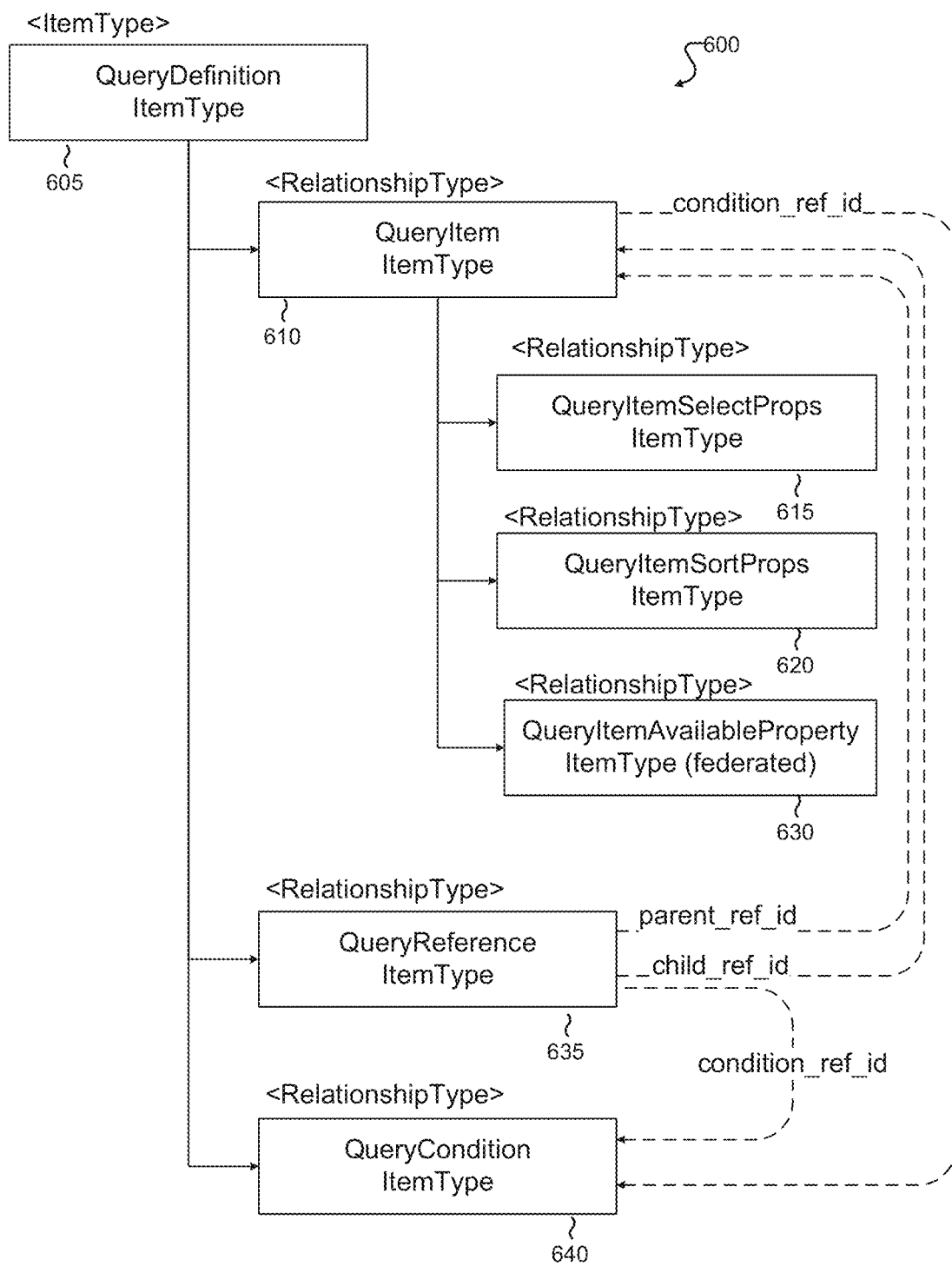
FIG. 6 illustrates, at a structural level, one example of a data model supporting a query definition item according to embodiments of this disclosure.

FIG. 6 illustrates, at a structural level, one example of a data model 600 supporting a query definition item according to embodiments of this disclosure. Note that, in this particular example, data model 600 comprises a hierarchical, tree like structure.

As shown in the non-limiting example of FIG. 6, data model 600 includes a query definition item 605, which occupies the top, or root level of the specified elements used to define a query. According to certain embodiments, query definition item 605 is an item of the "Query Definition" item type. Query Definition item 605 defines the set of data a user is interested in seeing. The data belonging to this set can be collected across one or more different Item Types using rules for filtering. Additionally, access controls can be implemented by defining additional filters excluding certain users from accessing (by including within the set of data encompassed by the user's query) data. According to certain embodiments, the properties of query definition item comprise a name, which can be a string specifying a unique name for the query definition. Additionally, the properties of query definition 605 can include a description, which can be a string or text describing the type of data represented by the query definition. Still further, the properties of the query definition can include a root query item id, which comprises a string representing the context item (also referred to as a root of the tree structure of data model 600) for query definition data model 600. According to other embodiments, properties of the query definition may include, without limitation, permissions.

According to certain embodiments, data model 600 is a self-describing data model which follows an "/Item/Relationship/Item/Relationship" description structure. Accordingly, in data model 600, a federated set of relationship properties 610 through 640 follow query definition 605. These relationships include query item 610. According to certain embodiments, query item 610 may appear as one or more <item> tags within a <relationship> container, such as shown in the example given in FIG. 3. Query item 610 is an item representing the source for properties, including properties to be selected and returned as part of the query response, and joins and filtering to be used, in the query definition. According to certain embodiments, the properties included in query item 610 include, without limitation, those set forth in Table 1 below:

TABLE 1

| Name | Label | Type | Description |
| --- | --- | --- | --- |
| classification | Classification | | Aggregation (GroupBy, SUM, AVG) Union Intersection Special Join |
| itemtype | ItemType | Item | ItemType which is described by Query Item (Item or Relationship) |
| Alias | Alias | String | Alias of Query Item which will be used in joins and conditions. |
| condition_ref_id | Referenced Condition | String | Referenced Query Condition. |
| ref_id | Reference ID | String | Reference ID of Query Item |

As shown in the non-limiting example of FIG. 5, query item 610 may have source and target relationships (such as described with respect to relationships 210 in FIG. 2) with other relationships within data model 600. For example, query item 610 may have both a parent and a child relationship with a query reference 635. Similarly, query item 610 may also be indicated as either the source or the target of a relationship with query condition 640.

According to certain embodiments, the relationships specified by data model 600 comprise query item selection properties 615, which define or identify which properties from query item 610 to include in the query response. An overview of the properties in one example of query item selection properties 615 is set forth in Table 2, below:

TABLE 2

| Name | Label | Type | Description |
| --- | --- | --- | --- |
| property_ref_id | Property | String | Reference to qry_QueryItemAvailableProperty via ref_id value. |

In some embodiments, the relationships specified by data model comprise query item sort properties 620, which define which properties from the associated query item are to be used for sorting data returned by the query, and how the sort is to be performed. An overview of properties of query item sort properties 620 is set forth in Table 3, below:

TABLE 3

| Name | Label | Type | Description |
| --- | --- | --- | --- |
| property_ref_id | Property | String | Reference to qry_QueryItemAvailableProperty via ref_id value. |

TABLE 3-continued

| Name | Label | Type | Description |
|---|---|---|---|
| sort_order | Sort Order | Integer | Order of sorting |
| sort_order_direction | Sort Order Direction | List | Values: Ascending, Descending |

According to various embodiments, the relationships specified by data model 600 further comprise query item available properties 630. In the non-limiting example of FIG. 6, query item available properties 630 define which federated properties from the associated query item to include in the query response. An overview of properties of query item available properties 630 is set forth in Table 4, below:

TABLE 4

| Name | Label | Type | Description |
|---|---|---|---|
| source_id | | Item (qry_QueryItem) | Reference to qry_QueryItem |
| name | Name | String | |
| label | Label | MLString | |
| type | Type | List | Data Type of the QueryItem property |
| ref_id | Reference ID | String | Reference ID (GUID) |

In the non-limiting example of FIG. 6, the relationships specified data model 600 further comprise query reference 635, which, like the other relationships shown in FIG. 6, may be expressed as an instance of an item within the <relationship> container tag. According to certain embodiments, query reference 635 defines join requirements between query items within the query definition, and as such, implements controls over how data is collected and aggregated across query items within the query definition which have relationships with one another. As shown in TABLE 5, below, in some embodiments, query reference 635 operates to specify relationships between query items in an analogous manner as relationships 212 in FIG. 2. An overview of properties of query reference 635 is set forth in Table 6, below:

TABLE 6

| Name | Label | Type | Description |
|---|---|---|---|
| parent_ref_id | Parent Item | String | Referenced parent Query Item. |
| child_ref_id | Child Item | String | Referenced child Query Item. |
| condition_ref_id | Referenced Condition | String | Referenced Query Condition. |

According to certain embodiments, the relationships specified within query definition data model 600 comprise query condition 640. Query condition 640 is an instance of an item which defines the filter conditions for the data request. According to certain embodiments, the scope of query condition 640 is the entity on which it is referenced, and a query condition can be optionally associated with a query item and query reference items. In the case where query condition 640 is referenced by a query item (for example, query item 610), then query condition filters the items defined by the query item. If, however, the query condition is referenced by a query reference (for example, query reference 635), it operates to filter the items defined by a query item referenced as the child query item for the query reference. An overview of properties of query condition 640 is set forth in Table 7 below:

TABLE 7

| Name | Label | Type | Description |
|---|---|---|---|
| condition_xml | Condition Xml | Text | Xml representation of specified conditions. |
| ref_id | Reference ID | String | Reference ID of Query Condition. |

FIGS. 7A and 7B illustrate an example of a markup language configuration document 700 setting forth the configuration of a query constructed based on a self-describing data model (for example, data model 600 in FIG. 6) according to embodiments of this disclosure.

As shown in the non-limiting example of FIGS. 7A and 7B, configuration document 700 includes an <item> tag 705 creating an instance of the query definition, whose properties include the action or method "qry_ExecuteQueryDefinition."

Referring to the non-limiting example of FIGS. 7A and 7B, configuration document 700 further includes three query condition items 710a, 710b and 710c specifying filters to be applied in the query. In this particular example, the properties of each of query condition items 710a through 710c are further specified by attributes further controlling the execution logic of the query. For example, in query condition item 710, the <condition> attribute is used to define the filter, as shown by the statement "<![CDATA[<condition><eq><property ref-id="TopPart_id_GUID"/><property ref-id="PBom_sourceId_GUID7"/></eq></condition>]]>".

Configuration document 700 further includes query items 715a, 715b and 715c which, set forth properties to be part of the query response, and the properties to be used in joins and filtering. For example, query item 715a specifies an item, having the name "part" and the attribute "keyed_name," with the value "4F1AC04A2B484F3ABA4E20DB63808A88" as a filter for items to be returned by the query.

In the non-limiting example of FIGS. 7A and 7B, query document 700 further comprises query item selection properties 720a, 720b, 720c and 720d, which variously specify properties from query items 715a and 715c to include in the query response. For example, query item selection property 720a specifies the property "TopPart_id" as a property to be returned with query response items satisfying the filter criterion "keyed_name" "4F1AC04A2B484F3ABA4E20DB63808A88" specified by query item 715a.

Additionally, in this illustrative example, query document 700 further comprises an instance 725 of a query item sort property. In the non-limiting example of FIGS. 7A and 7B, instance 725 of a query item sort property specifies "TopPart_name" as the property to sort the items in the query response, and instance 725 of query item sort property includes the attribute "sort order direction" whose value "Ascending" indicates that the query response items are to be sorted by "TopPart_name" in ascending order.

As shown in the non-limiting example of FIGS. 7A and 7B, query document 700 further includes query reference items 730a and 730b, which specify how, in executing the query, data is collected and aggregated across query items which have relationships with other query items within the query definition. In this particular example, query reference items 730a and 730b specify join requirements, as shown, for example, by the property "<condition_ref_id>join_cond_1</condition_ref_id>" in query reference item 730*a*.

Figure 8:
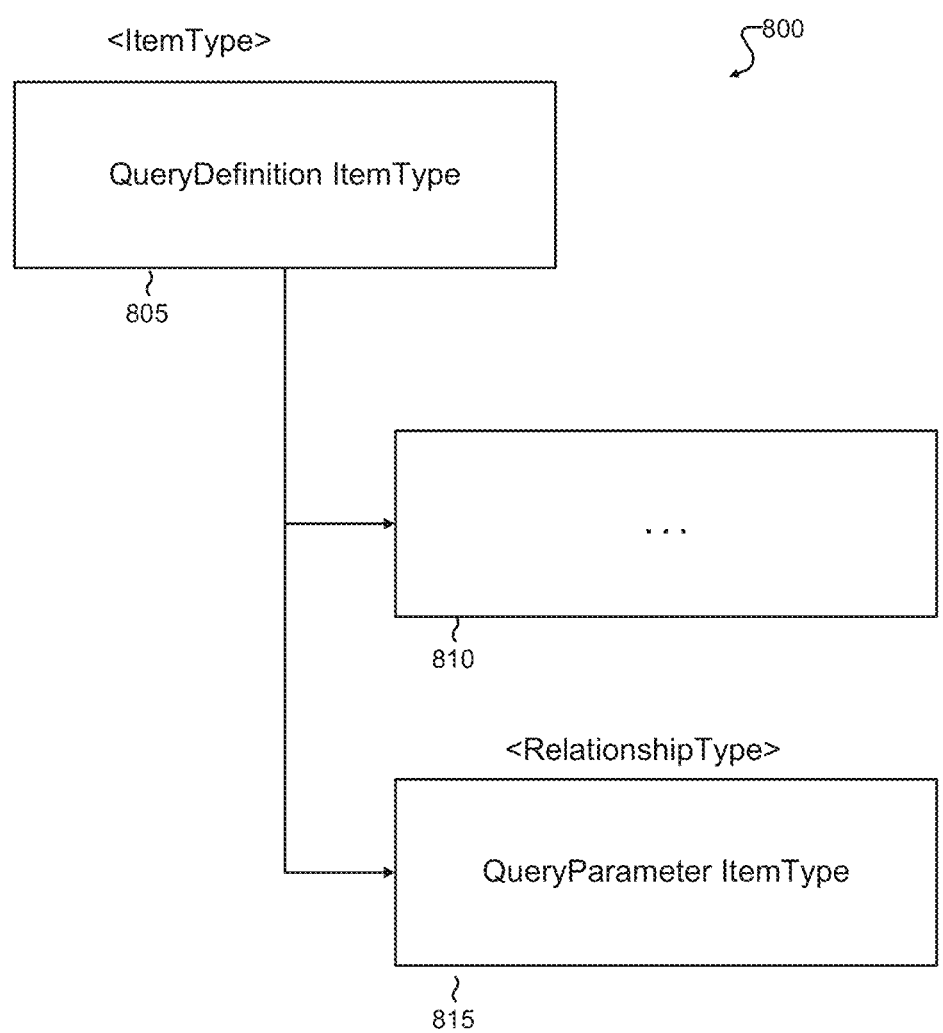
FIG. 8 at a structural level, an exemplary embodiment of an extension of a data model 800 for configuring recursive searches of a self-describing data system.

FIG. 8 illustrates, at a structural level, an exemplary embodiment of an extension of a data model 800 for configuring recursive searches of a self-describing data system.

In the non-limiting example of FIG. 8, data model 800 is represented as having a hierarchical tree structure, with query definition item 805 as the root, or context item type. Further, according to certain embodiments, data model 800 represents a query in a self-describing data system, whose elements follow a regular "/Item/Relationship/Item/Relationship" pattern.

Data model 800 may, according to various embodiments, include a variety of types of items 810 specifying relationships within the query definition. These items may comprise, for example, items 610-640 in FIG. 6, or a subset or superset thereof. Additionally, according to certain embodiments, data model 800 may further comprise items 815 belonging to the query parameter item type. According to various embodiments, query parameters comprise a user-defined parameter within query conditions which can be supplied at query execution time to override default values. Additionally, query parameters may also be used in other assignable values within a query definition, such as in offset and fetch values. The values for the parameters specified within the query parameter item may then be assigned at the time the query definition is to be executed.

Additionally, items 815 belonging to the query parameter item type may also be utilized to track or control aspects of the execution of a query. For example, according to certain embodiments, a user designed parameter "@ExecutionPath" is a dynamic parameter which may be calculated while processing a query definition to determine the progress of a query. Additionally, according to certain embodiments, items 815 belonging to the query parameter item type may also be used to define a query execution path, reflecting a route from a parent query item to a child query item in a query definition. Still further, items 815 belonging to the query parameter item type may be used to control the depth (i.e., how many levels are traversed) of recursion of a recursive query. According to some embodiments, a query engine (for example, query engine 415 in FIG. 4) will, by default and in the absence of a query parameter item specifying otherwise, exhaustively traverse all recursive paths.

FIG. 9 illustrates an embodiment of a query configuration document 900 comprising an instance of an item 905 belonging to the query parameter item type which provides a user-defined filter on the query response data set. As shown in the non-limiting example of FIG. 9, the container tag 907 "<Parameters>" signals the creation of the user-defined parameter having the name "@PartNumber," and the value "IN-0001." Further, as shown in FIG. 9, the parameter "@PartNumber" is specified as a filtering property 910 of a query response data set.

FIG. 10 illustrates an embodiment of a query configuration document 1000 comprising an instance 1005 of items belonging to the query parameter item type, by which the query execution path of the query, in particular, the query recursion depth, may be controlled by defining a condition dependent on a value of the query parameter item. As shown in the non-limiting example of FIG. 10, an instance 1005 of the query parameter item defines the parameter named "@Levels," as being of an integer type. Once defined, the "@Level" parameter, in conjunction with the "@ExecutionPath" parameter is used as a value in conditional 1010, which determines the depth of the recursive query defined by query configuration document 1000.

Figure 11:
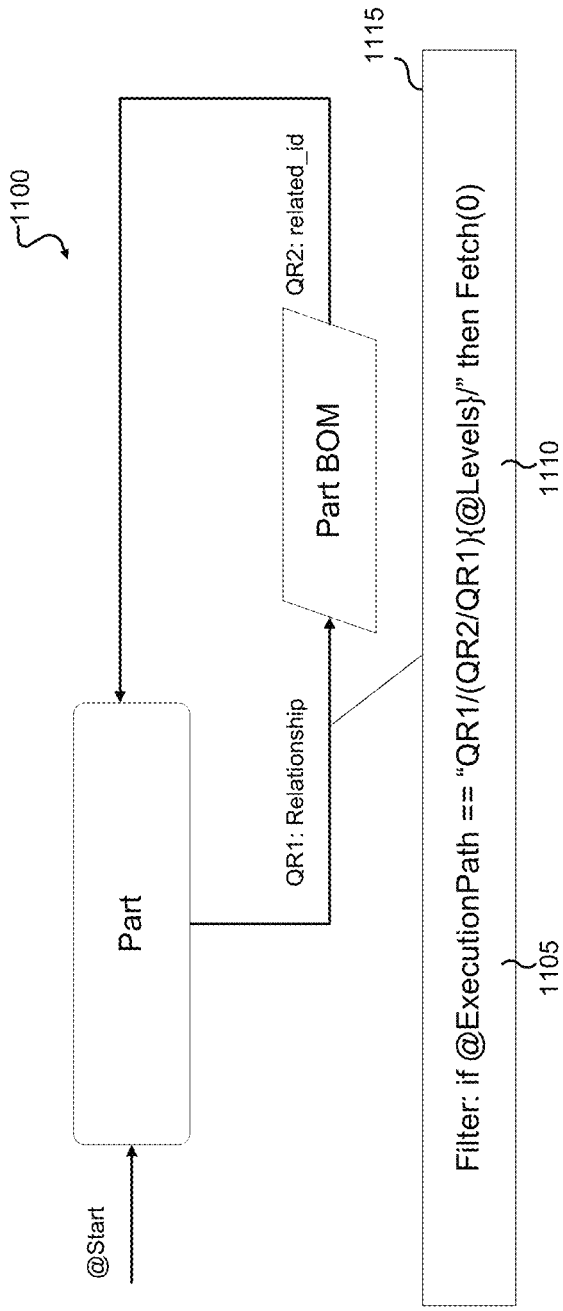
FIG. 11 illustrates, in wireframe format, an example of a query execution path for a query performed according to embodiments of this disclosure.

FIG. 11 illustrates, in wireframe format, a query execution path 1100 of a query (for example, the query described by query configuration document 1000 in FIG. 10). In the non-limiting example of FIG. 11, two items of the query parameter type are used to control query execution path. In this particular example, the first item 1105 of the query parameter type is the dynamic parameter "@ExecutionPath," and the second item 1110 of the query parameter type is the parameter "@Levels."

According to various embodiments, "@ExecutionPath" is a parameter calculated by a query execution engine (which according to certain embodiments, may be embodied as part of a query engine, such as, for example, query engine 415 in FIG. 4) tracking where the query execution engine is during the execution of a query definition. According to certain embodiments, query parameter "@ExecutionPath" is an item in a self-describing data system of the type "Path." In this particular example, the value of query parameter "@ExecutionPath" is a string reflecting a route from a parent query item (for example, query item 610 in FIG. 6) to a child query item via one or more query references (for example, query reference item 730*a* in FIG. 7).

In some embodiments, the query parameter "@Levels" is a parameter specifying the number of levels to "drill down" in a recursive search. Thus, in the example of FIG. 11, the execution path of the query, specifically, the items which are fetched while executing the query, is defined by the filter 1115 "if @ ExecutionPath "QR1/(QR2/QR1){@Levels/}/" then Fetch(0)." In this non-limiting example, if the value of the parameter "@Levels" is zero, then the query pulls no items, because /QR1(/(QR2/QR1){0}/ is equal to "/QR1/" limiting the path of the "Part" query to "Part BOM." If "@Levels"=1, then the query "drills down" one level and fetches the root "Part." If "@Levels"=2, then the query "drills down" two levels, fetching the root "Part" and its children. Similarly, if "@Levels"=3, then the query "drills down" three levels within the hierarchy of the data structure, fetching the root "Part", its children and their children.

After an execution engine implements execution instructions based on the query definition, query engines according to certain embodiments of this disclosure obtain the results of the executed query and output the query results.

Figure 12A:
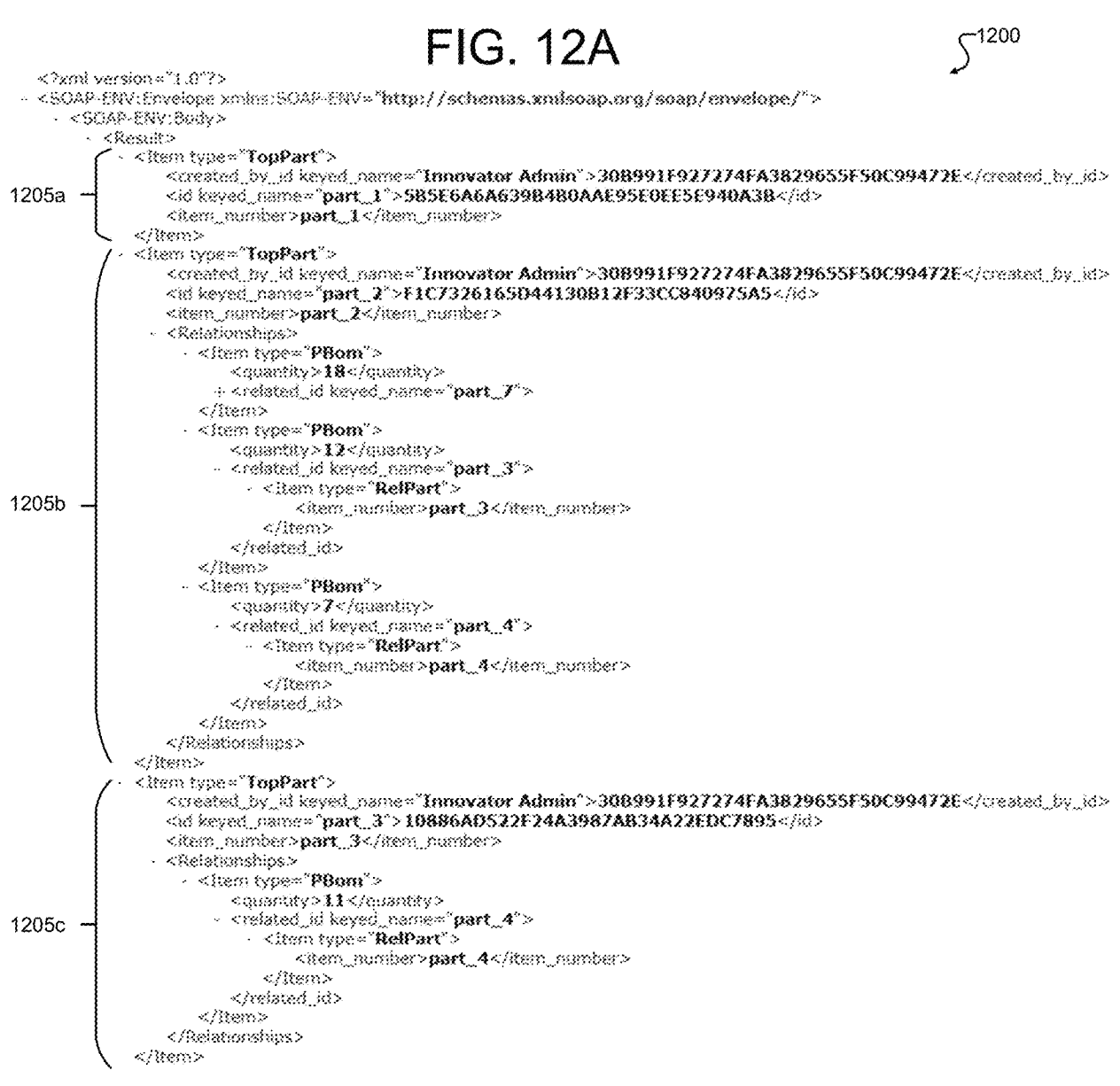

FIGS. 12A and 12B illustrate an example of a markup language document 1200 comprising query results obtained and outputted in a structured format. Specifically, markup language document 1200 comprises AML format results of the recursive query configured by query configuration document 700 shown in FIGS. 7A and 7B of this disclosure. According to certain embodiments, a query response, such as provided by document 1200 comprises the results of a query executed according to a query definition.

As shown in the non-limiting example of FIGS. 12A and 12B, query results 1200 mirror the "/Item/Relationship/Item/Relationship" structural pattern of the query definition and other documents constructed according to a self-describing data model. As shown in FIGS. 12A and 12B, the query returned results 1205*a* through 1205*g*, which, as specified by query item selection property 720*c* in FIG. 7 belong to the item type "Top Part." Further, as discussed elsewhere in this disclosure, in the absence of a query parameter item overriding a default recursion depth, the query was executed until a terminal node for each item in the query definition was reached, as shown by, for example, result 1205*b*.

According to certain embodiments, a query engine may output query results in a structured format, such as the structured format of the query definition (for example, as shown in FIGS. 12A and 12B) of this disclosure. According to certain other embodiments, the query engine may output results according to a different structural format, such as a graph visualization.

Figure 13:
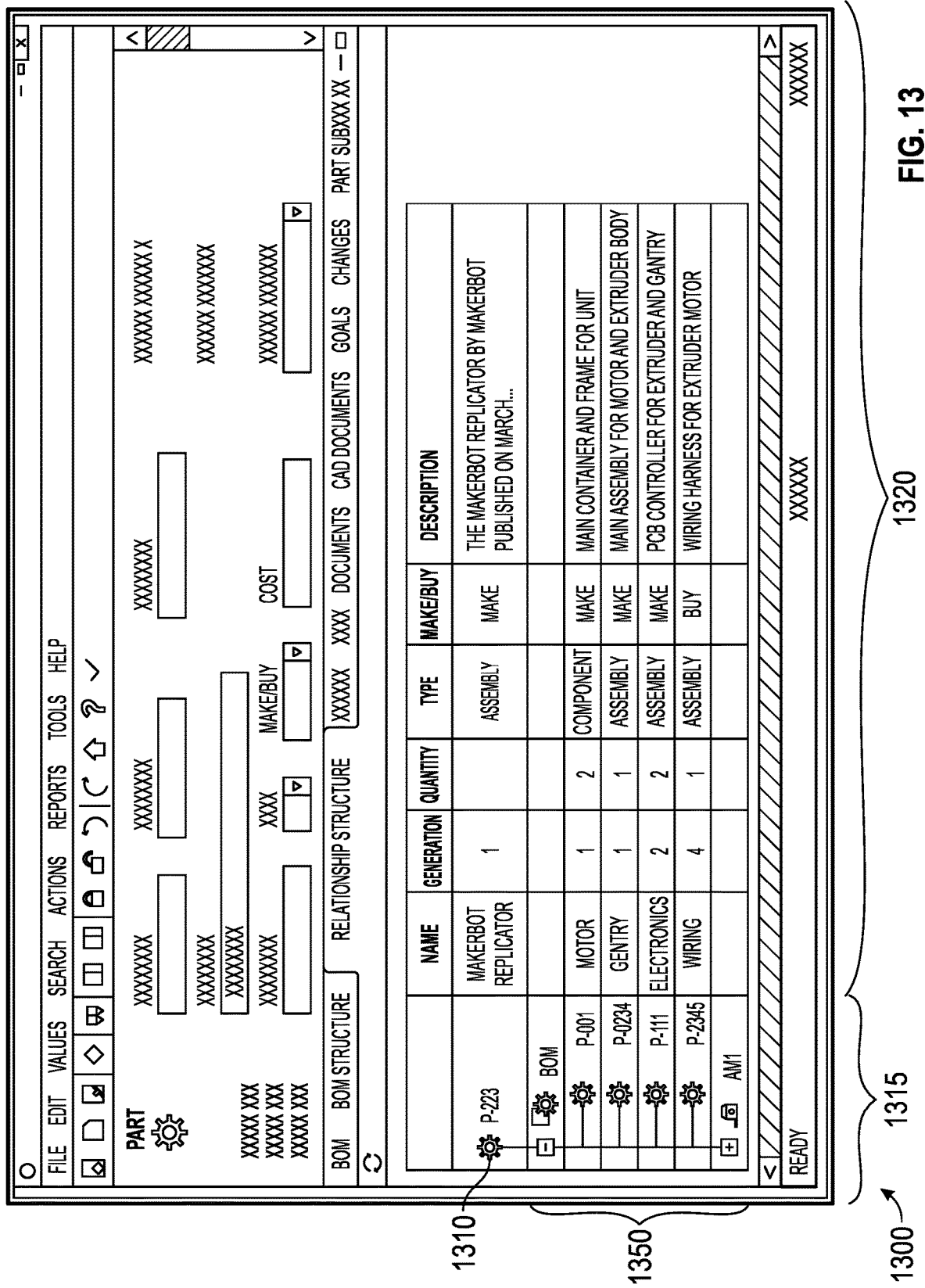
FIG. 13 illustrates of query results output in a tree grid format according to various embodiments of this disclosure.

As shown by FIG. 13, a query engine according to certain embodiments of this disclosure may output query results in a tree grid format. In the non-limiting example of FIG. 13, a view 1300 of a user interface (such as presented by front end 420 in FIG. 4) showing query results 1305 in a tree grid view. According to embodiments, the tree grid view enables the query results to be displayed in a way that reflects the structure of the query definition by which they were obtained. As such, according to certain embodiments, query result items are displayed in a hierarchical manner reflecting their relationship to a context item, or root node, and which displays the relationship between items obtained by the executed query. In this particular example, query results 1305 are shown according to their relationship to context item, or root node "P-123," which in this example, corresponds to a "MakerBot Replicator." According to certain embodiments, the leftmost column 1315 of the tree grid view indicates hierarchical (i.e., parent-child relationship between the displayed items), while the columns to the right 1320 indicate properties of the items returned by the executed query.

According to certain embodiments or under certain conditions (for example, when performing very, very large queries, such as queries of a bill of materials for a helicopter, which when expressed as items in a self-describing data structure, may comprise a data structure with ~30,000,000 item nodes) the performance of the query engine may be improved by outputting the query results in a "flat" or unstructured format. In contrast to certain structured output formats according to embodiments of this disclosure, wherein the query results are outputted in a manner that reflects and allows reconstruction of, the hierarchy and relationships within the query structure and query execution path, a "flat" output may adhere to a simplified structure, wherein only "key properties" are displayed. In this way, the file size of the query result may be made more manageable.

FIG. 14A illustrates an example of a query result set 1400 of an executed query which has been output in a structured format, in this case AML. In this non-limiting example, a significant portion of the output 1405 is dedicated to </Relationship>container tags for expressing the hierarchy of relationships between items in the result set.

FIG. 14B illustrates an example of a query result set 1410 for the same query as in FIG. 14A, which has been output in a flat format with "id" defined as a key property of the output. Skilled artisans will appreciate that result set 1405 may be more readily processed than result set 1400 in the absence of an extended hierarchy defined by multiple </Relationship> container tags 1405. Further, according to certain embodiments, query result set 1400 may be readily converted into a structured result by calling the "qry_ConvertFlatToStructuredResult" method of the Aras IOM API.

The functionality and performance of query engines according to embodiments of this disclosure may be further enhanced by through the use of extended classification items. Extending the data model of a self-describing data system through the use of extended classifications may enhance the ability of the query engine to perform queries of polyhierarchical relationships, equivalence and associative relationships. Further, extended classifications according to embodiments of this disclosure may enhance the operation of a query engine, by enabling users to add additional properties to an item, without changing the underlying item type of the item. In this way, searches across the additional properties may be conducted quickly, in that the result set will not necessarily include null classes for the item instances not having the newly added (or extended) properties.

According to certain embodiments, an extended classification encompasses a kind of item, defining a collection of properties, which are specific to an object classified by a term. Further, in some embodiments, an extended property comprises a property which exists on a global scope and which is not specific to any one item type. According to certain embodiments, extended properties may be defined via one or more extended classifications.

Figure 15:
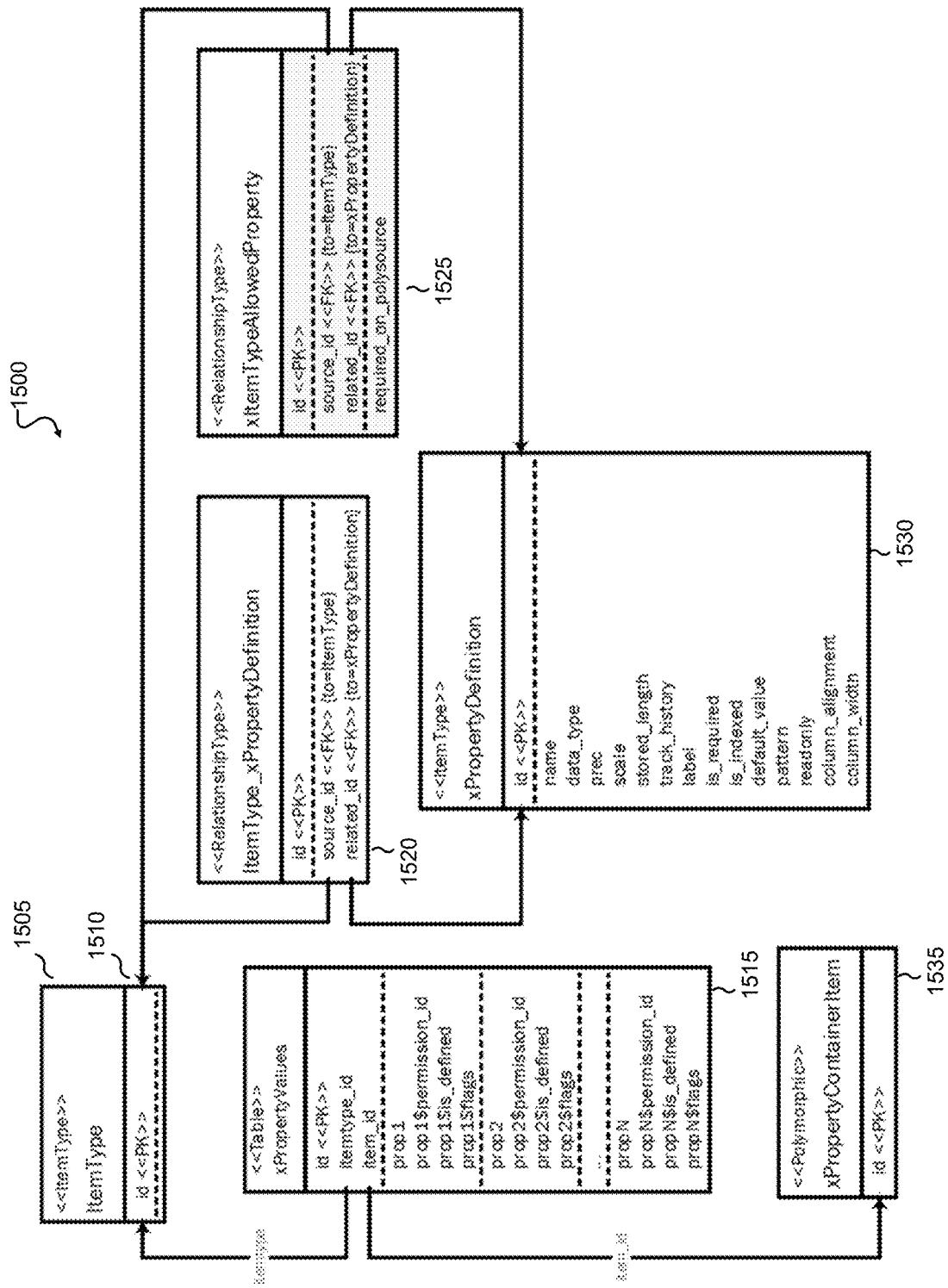
FIG. 15 illustrates a data model for implementing extended properties in a self-describing data system according to various embodiments of this disclosure.

FIG. 15 illustrates a data model 1500 for implementing extended properties in a self-describing data system according to various embodiments of this disclosure.

As shown in the non-limiting example of FIG. 15, data model 1500 is hierarchical and anchored, or rooted to an instance of an item type 1505, whose properties include an "id" value 1510 which operates as a primary key specifying relationships between instance of an item type 1505 and extended property items 1515-1535.

According to various embodiments, data model 1500 describes a self-describing system whose items follow an "/Item/Relationship/Item/Relationship" structural pattern. Further, data model 1500 comprises xPropertyDefinition ItemType 1530, which defines a property which is defined on a global scope and is not specific to any one item type. As shown in FIG. 15, xPropertyDefinition ItemType 1530 is a child of ItemType_xPropertyDefinition Relationship Type 1520. A list of properties supported by xProperty Definition ItemType 1530 is shown in TABLE 8 below:

TABLE 8

| Property Name | Label | Data Type |
| --- | --- | --- |
| name | Name | string (32) |
| label | Label | ml_string |
| data_type | Data Type | list (Data Types) |
| data_source | Data Source | Item (ItemType) |
| stored_length | Length | integer |
| prec | Precision | integer |
| scale | Scale | integer |
| is_required | Required | boolean |
| is_indexed | Indexed | boolean |
| column_alignment | Alignment | list (Text Alignment) |
| column_width | Width | integer |
| default_value | Default Value | ml_string |
| pattern | Pattern | string (512) |
| readonly | Read Only | boolean |
| help_tooltip | Tooltip | ml_string |
| track_history | Track History | boolean |

According to certain embodiments, data model 1500 further comprises ItemType_xPropertyDefinition Relationship Type 1520, which describes a link between a particular ItemType and an xPropertyDefinition ItemType 1530. According to various embodiments, any xProperty Definition can be assigned to multiple ItemTypes and any ItemType may have multiple assigned XProperty definitions.

As shown in the non-limiting example of FIG. 15, data model 1500 may further comprise xItemTypeAllowedProperty Relationship Type 1525. According to certain embodiments, xItemTypeAllowedProperty Relationship Type 1525 describes a link between a particular ItemType and an xPropertyDefinition, which contains all allowed xProperties for the ItemType. As used in this disclosure, an allowed xProperty refers to an xProperty assigned to a particular ItemType, and which is the only xProperty which can be defined on Items of that particular ItemType.

According to certain embodiments, data model 1500 comprises xPropertyContainerItem 1535, which describes an ItemType which has at least one allowed xPropertyDefinition. When an xPropertyDefinition is assigned to this ItemType, this ItemType will be added to a list of polymorphic sources of xPropertyContainerItem 1535.

In some embodiments according to this disclosure, data model comprises a table of xPropertyValues 1515. As noted elsewhere in this disclosure, the implementation of extended classifications and extended properties enables properties to be dynamically added or removed from an instance of an ItemType without changing the type of the item. According to some embodiments, this may be accomplished by maintaining the values of the extended properties in a separate table from the items to which they relate.

Figure 16:
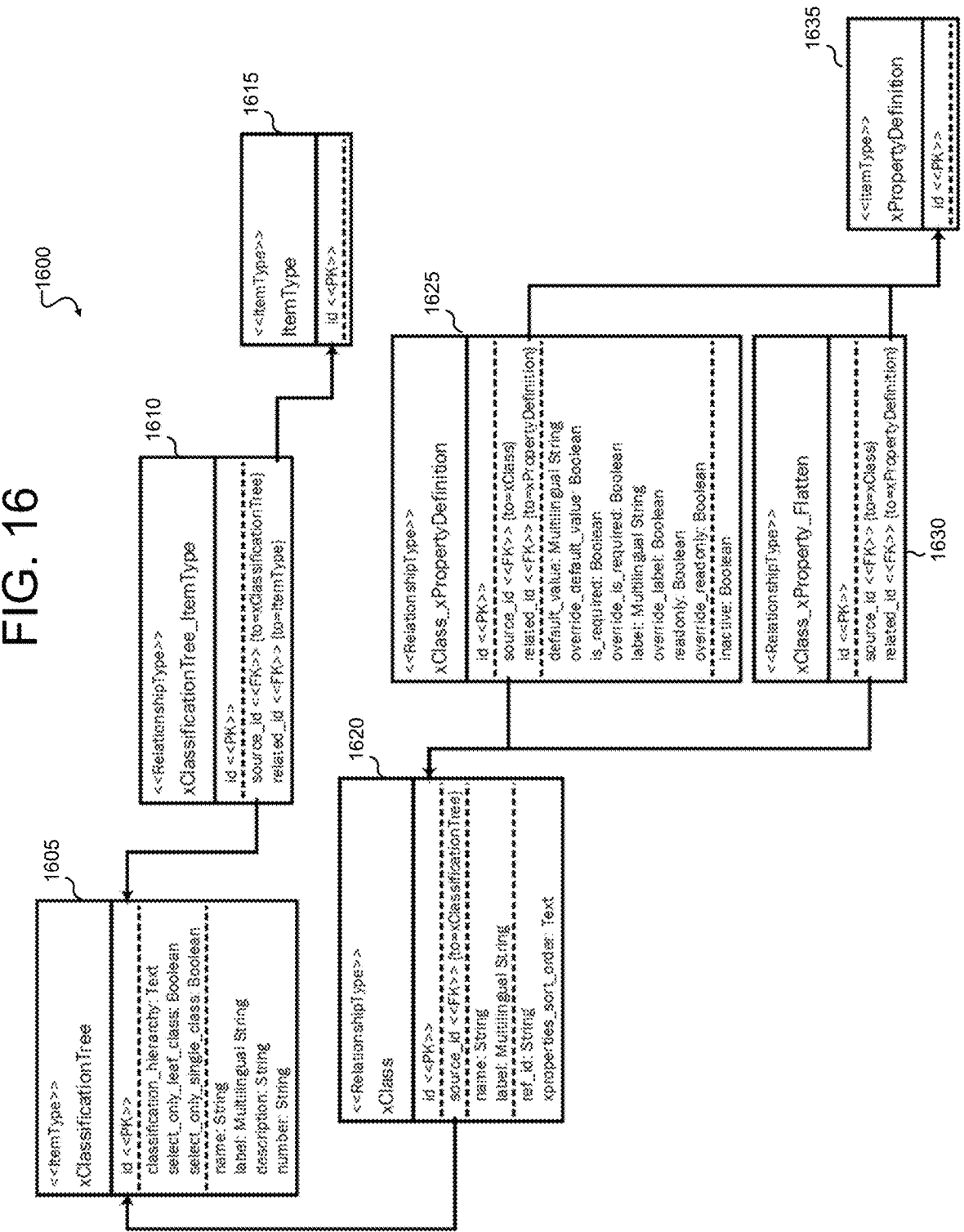
FIG. 16 illustrates an example of a data model for implementing extended classification according to embodiments of this disclosure.

As discussed elsewhere in this disclosure, an extended classification is a type of item which defines a collection of properties, which may be specific to an object classified by a term. FIG. 16 illustrates an example of a data model 1600 for implementing extended classification in a self-describing data system according to embodiments of this disclosure.

In the non-limiting example of FIG. 16, data model 1600 comprises, as its context item, or root, an instance of xClassificationTree ItemType 1605. According to embodiments, xClassificationTree ItemType 1605 defines a taxonomy, which is a collection of terms (also referred to as "xClasses," organized into a hierarchical structure. xClassificationTree ItemType 1605, is, according to certain embodiments, a self-contained unit which contains xClasses which are specific to only that tree. The properties of xClassficationTree ItemType 1605, according to certain embodiments are shown in Table 9, below:

TABLE 9

| Property Name | Label | Data Type |
| --- | --- | --- |
| name | Name | string (32) |
| item_number | Number | string (32) |
| description | Description | text |
| classification_hierarchy | Classification Hierarchy | text |
| label | Label | ml_string |
| select_only_leaf_class | Restrict Selection to only Leaf Classes | boolean |
| select_only_single_class | Restrict Selection to a Single Class | boolean |

According to embodiments, data model 1600 may further comprise xClassificationTree_ItemType RelationshipType 1610, which defines a list of dimensions available for xClassificationTree ItemType 1605. xClassificationTree_ItemType RelationshipType 1610 may further be associated with one or more ItemTypes 1615.

In various embodiments according to this disclosure, data model 1600 may further comprise xClass Relationship Type 1620. As noted elsewhere instances of XClass represent a concept named by a term, which in turn define a collection of properties, further specified by xClass_XProperty Definition Relationship Type 1625.

In the non-limiting example of FIG. 16, data model 1600 includes xClass_xPropertyDefinition Relationship Type 1625, which describes a link between a particular xClass and an xPropertyDefinition.

Additionally, data model 1600 may further comprise instances of xClass_xProperty_Flatten Relationship Type 1630, which, describes a link between a particular xClass and xPropertyDefinition, and which contains all of the xProperties of a given xClass, including both the xClass's own properties and its inherited properties. According to some embodiments, a list of inherited properties may be calculated based on a hierarchy reflected in xClassificationTree ItemType 1605. As shown in the non-limiting example of FIG. 16, xClass_xPropertyDefinition Relationship Type 1625 and xClass_xProperty_Flatten Relationship Type 1630, are in turn, lied to at least one instance of xPropertyDefinition ItemType 1635.

A product variant is a specific configuration of product for certain option choices, such as size Medium and color Red. The complexity of product variants grows exponentially with the number of features available in the product, and the number of options within each feature. The complexity is multiplied by the time dimension, where new features and options are introduced, or existing features and options are obsoleted. Constraints may restrict the set of allowed or compatible option combinations.

Configurator services may, as disclosed herein, may enable developing variant management applications to manage product complexity. The configurator services may use a rule-based configuration paradigm with a built-in Boolean Satisfiability (SAT) solver. Using configurator services, customers (e.g., entities) may have the ability to define any data model and business logic to meet business processes. For instance, companies may be managing their products by platforms, product lines, product models, systems/subsystems, or other product groupings. Product features, options and constraints/rules may be defined at all relevant levels for these structures. Configurator services may provide the means to implement server method to translate business data into input data for configurator APIs.

In some embodiments, configurator services may be provided to solve variability problems and provide valid configurations and/or combination of items (e.g., parts) in a computationally efficient manner. Solution spaces may be found that provide one or more indications of valid combinations and/or invalid combinations. The solution spaces may be presented in a user interface of the front end 420. The solution space may include identifiers (e.g., part number) for the items (e.g., part) that are validly combinable, and/or identifiers for the items that are not validly combinable. The valid combinations of items may be presented in a list in the solution space in a user interface. Graphical elements may enable a user to select one or more of the valid combinations to view additional information pertaining to the valid combination and/or to perform an action pertaining to the valid combination. For example, the user may edit the valid combination, save the valid combination, name the valid combination, transmit the valid combination to a system for manufacturing, etc. The solution spaces may be generated based on a query received from the front end 420. In some embodiments, the query may be received in AML or XML format, as discussed further herein.

A processing device executing at the backend 410 and/or the API 425 may receive the query and generate a free-form Boolean expression language query. Accordingly, the format of the query may be modified to enable efficient processing of the query by the query engine 415 using a format that enables searching and/or recursive searching of a self-referencing data model that uses items having certain item types, as described herein. Based on the query, the processing device may retrieve information from the self-referencing data model that stores the information as one or more items having one or more item types. The information may include one or more variables associated with an entity and values for the one or more variables defined by one or more files of the entity. The entity may be associated with manufacturing the product. The one or more variables may be defined by one or more features that are linked to a source of the one or more files. Further, the information may include one or more rules that specify compatibility constraints between the one or more variables. Based on the rules and the variables, the processing device may generate a solution space comprising the one or more values of variables that satisfy the rules. The solution space may be presented on a user interface of the front end 420.

For example, a solution space may be generated based on 4 variables with 2 values each and in view of 4 rules. The variables may include Animal, Diet, Communication, and Color. The values for Animal may include Frog and Canary. The values for Diet may include Flies and Veggies. The values for Communication may include Croak and Chirp. The values for Color may include Green and Yellow. The rules may include 1) IF Croaks and eats Flies THEN Frog, 2) IF Chirps and eats Veggies THEN Canary, 3) IF Frog THEN Green, If Canary THEN Yellow.

The processing device may execute the configurator services to find valid combinations of values of variables by solving a variability problem. In some embodiments, an objective may include finding the answer to the variability problem using a rule-based configuration paradigm. The processing device may derive one or more solutions in a forward-chaining manner. At each iteration, the processing device may examine the entire set of rules and considers only the rules it can execute next. That is, some rules may not be eligible to be executed next if their constraints and/or conditions do not apply to the current set of values of variables in the current solution space. The iterations are repeated until the goal is reached.

For example, if a query is for an Animal that Croaks and eats Flies, and the goal is to find which Animal it is. Rule 1) may be applied and the answer may output Frog. If the query is for an Animal that is Yellow, and the goal is to find which Animal it is. Rule 4) may be applied and the other rules 1)-3) may be ignored and the answer may output Canary. In another example, if the goal is to find valid combinations, based on the rules, there are only 2 out of 16 possible combinations. The valid combinations are Frog, Flies, Croak, Green, and Canary, Veggies, Chirp, and Yellow.

A free-form Boolean expression language may be used to determine whether the combination of values of the variables are valid. For example, if a Boolean expression includes values of Frog and Flies and Croak, then that Boolean expression is satisfied and the combination is valid. If a Boolean expression includes values of Canary and Flies and Croak, then that Boolean expression is not satisfied and the combination is invalid.

Such techniques may be useful in certain industries, such as the vehicle industry where each vehicle has thousands, millions, and/or billions of parts and the possible combination of the parts for each component is huge. For example, a solution space may be generated for an entity in the automotive industry. There may be 390 features, approximately 5 options per feature, and 12,500 or more rules to traverse. The number of combinations of features is $5^{990}$, and it may be desired to determine the number of valid combination by applying the rules. The disclosed techniques provide a technical solution to enabling identifying the valid combination of items in a self-referencing data model efficiently.

The configurator services may enable variant management and product configurations where items associated with the product are stored in the self-referencing data model. Example items may include any suitable asset, such as parts (e.g., for any object like vehicles, furniture, computers, etc.), documents, electronics, software, etc. There may be various usage conditions that the items can be validly combined. For example, if a bike is being configured and a frame is selected, there are certain tire types and seat types that are allowed to be combined with that frame. There are also variations to the tire types and seat types that can be combined with that frame. A usage condition may be an expression such as if the frame is green then the frame is medium and titanium. Further, the usage condition may specify when a part number may be allowed to be used with other part numbers in valid combinations.

The configurator services may use a Boolean Satisfiability (SAT) solver such as MiniSAT that uses conjunctive normal form (CNF). A Boolean expression may be converted to the CNF. The Boolean expression may be generated based on the query, and the Boolean expression may include one or more rules, variables, and/or values of the variables as described further herein. In some embodiments, the entity associated with the product being configured may define the Boolean expression and provide the Boolean expression to the processing device that uses the Boolean expressions to generate solution spaces. The configurator services may not persist a data model in memory. In some embodiments, an application programming interface (API) may be used and/ or an in-memory scope object model may be used to generate the solution space with the self-referencing data model. One or more APIs may be used to perform the disclosed techniques and the APIs may be AML compliant. In some embodiments, the API 425 may execute the configurator services and may be called using a REST API (OData). The API 425 may validate variability definitions, solve variability problems using rules to find a list of valid options, and provide invalid combinations including the reason why they're invalid.

In some embodiments, there may be at least two user interface (UI) controls available in configurator services. A RuleEditor and VariantsTree. Each UI control may be associated and/or implemented by one or more respective APIs. The RuleEditor control may enable a user to input text uing an "input group template". A user may either enter text manually or by using an intellisense menu. The user may also customize the view for individual groups or within a group for specific group types. Various properties may be configured in a composite parameter of a constructor. The VariantsTree control may enable a user to create and interact with a layered view. The view may contain the following default layers: tree visualization and/or group visualization. The view may be scalable and context menus may be supported.

Figure 17:
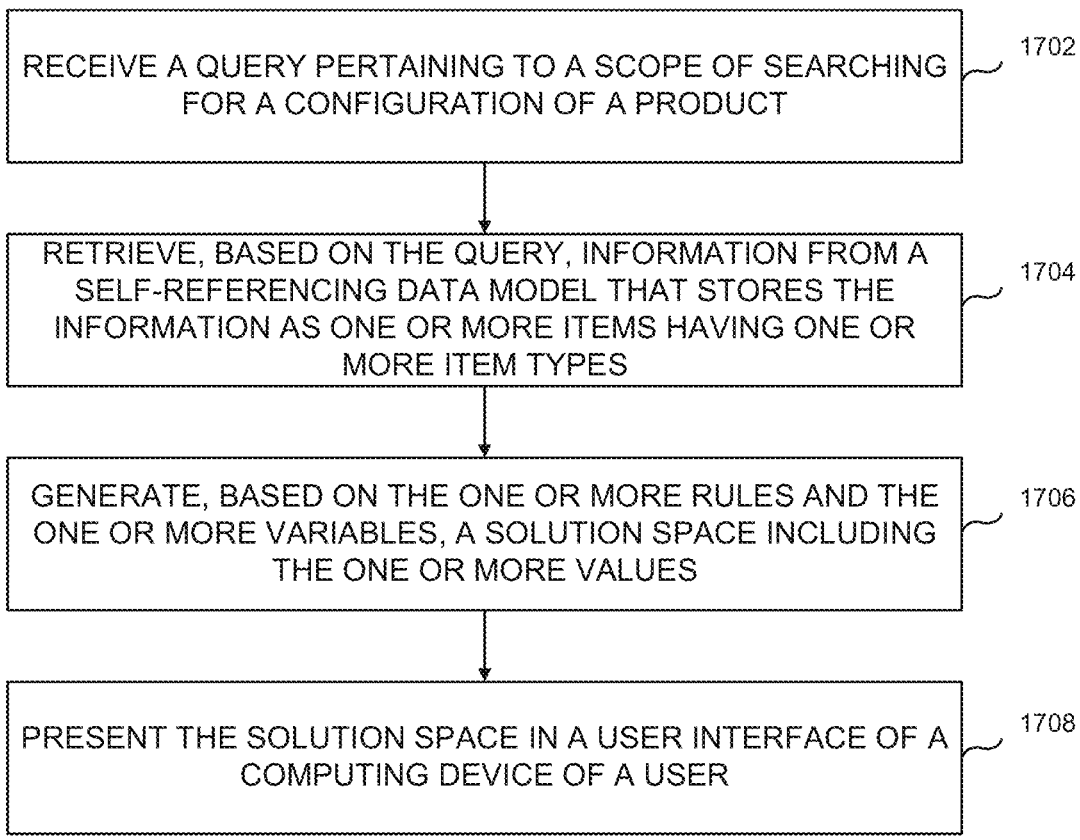
FIG. 17 illustrates an example flow chart of a method for generating a solution space based on a query pertaining to a scope of searching for a configuration of a product according to embodiments of this disclosure.

FIG. 17 illustrates an example flow chart of a method 1700 for generating a solution space based on a query pertaining to a scope of searching for a configuration of a product according to embodiments of this disclosure. One or more of the operations of the method 1700 may be performed by the backend 410, the front end 420, and/or the API 425. In some embodiments, the query engine 415 may implement instructions for one or more configurator services that perform one or more operations of the method 1700. For example, the front end 420 may present, in a user interface, a solution space that is generated based on a query of a scope for configuring one or more items associated with a product.

The method 1700 includes operation 1702, wherein one or more processing devices receives a query pertaining to a scope of searching for a configuration of a product. In some embodiments, the one or more processing devices may generate an expression using a free-form Boolean expression language including an nested structure. The scope may relate to an entire vehicle being configured, or the scope may be a door for a house, or a packaging for a product, or any suitable scope for an item or component that includes valid and/or invalid combination of sub-items and/or sub-components.

At operation 1704, the one or more processing devices may retrieve, based on the query, information from a self-referencing data model that stores the information as one or more items having one or more item types. The information may include one or more variables associated with an entity and values for the one or more variables defined by one or more files of the entity. In some embodiments, the self-referencing data model may be agnostic to a type of data model associated with the one or more files of the entity. For example, a query may be received in AML and include data from the data model of the entity. The AML may be processed by the query engine 415, for example, and converted to a free-form Boolean expression. The processing device may analyze the free-form Boolean expression (e.g., its operations and there combination and/or order in the Boolean expression) and convert the free-form Boolean expression to a different format (e.g., conjunctive normal form) to be used to generate a solution space including a valid combination of items for the query.

The one or more variables may be defined by one or more features that are linked to a source of the one or more files. In some embodiments, features may refer to a superset of items, such as a door for a vehicle, and the variables may be subsets of items related to the superset. The variables for a door feature may include a handle, paint, window, tint, etc. and each variable may have a value. For example, the paint variable may have a value of blue. Each of the features may be different based on the source of the files. The source may relate to a data model associated with the entity associated with the product being configured. Based on the source of the files, the features may have differing variables.

The information may also include one or more rules that may specify compatibility constraints between the one or more variables. The features, variables, and/or rules that are fetched are specific to a Boolean expression derived from the query. Each piece of the information may be an item type in the self-referencing data model. For example, rule may be an item type and each instance of the rule may be an item. The information may be used during runtime and not persisted to memory. Runtime may refer to when the processing device is executing the instructions implementing the method 1700 and the information is loaded into random access memory (RAM) that is volatile memory. The processing device may access the information in RAM during execution. The information may not be persisted to memory, such as read only memory that is non-volatile.

At operation 1706, the one or more processing devices may generate, based on the one or more rules and the one or more variables, a solution space including the one or more values. The solution space may be a scope object that is not persistent in memory and that is built during runtime based on the rules and the variables. The solution space may include the values of the valid combinations of items pertaining to the query and/or the values of the invalid combinations of items pertaining to the query. A scope builder may determine what information to retrieve from a data model associated with the entity.

An example may include a query related to a model of a particular automobile. The scope builder may retrieve the various valid combination of engines, seats, doors, wheels, roofs, consoles, etc. that are available for that selected model and those valid combinations may be presented in the solution space in the user interface of the front end 420.

In another example, an engineer may use the front end 420 to determine a desired part number for a part that is included in a valid combination of parts (items). That is, the engineer may select, using the user interface, an interior for a vehicle that has black leather with brown stitch thread for the seats. The configurator services may identify one or more part numbers for a valid combination of black leather and brown stitch thread for a seat. There may be numerous different materials, colors, different threads, size threads, colors, etc. and the solution space may present the valid combinations and/or the part number of each item in the solution space.

At operation 1708, the one or more processing devices may present the solution space in a user interface of a computing device (e.g., front end 420 of a user). In some embodiments, the user interface may present or include one or more indications of whether a combination of the values are compatible with each other or are not compatible with each other.

In some embodiments, the method 1700 may include using an application programming interface (API) to interact with the computing device of the user. The API may be hosted by a server external to the computing device of the user.

Figure 18:
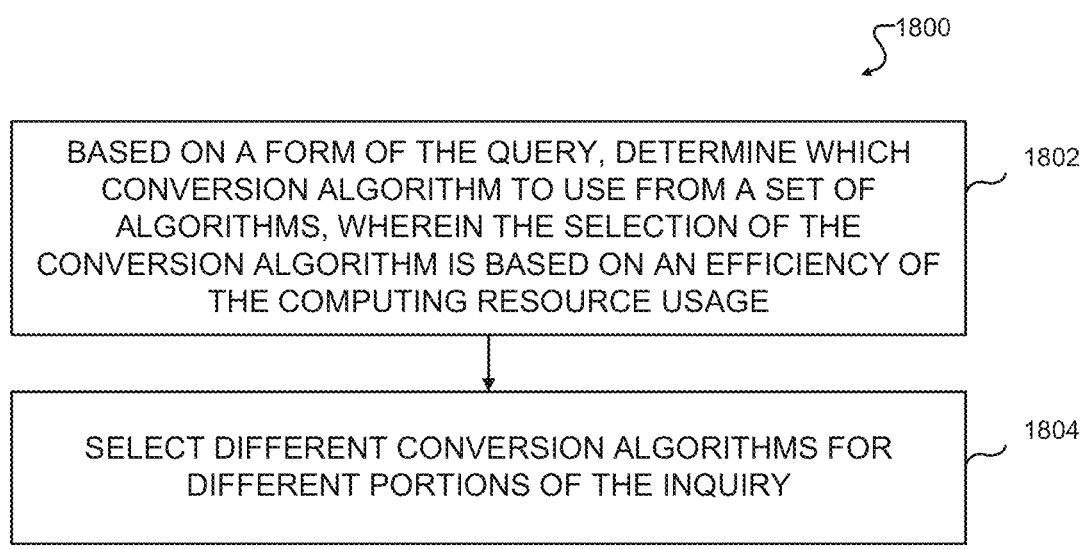
FIG. 18 illustrates an example flow chart of a method for selecting a conversion algorithm to use based on a form of the query according to embodiments of this disclosure.

FIG. 18 illustrates an example flow chart of a method 1800 for selecting a conversion algorithm to use based on a form of the query according to embodiments of this disclosure. One or more of the operations of the method 1800 may be performed by the backend 410, the front end 420, and/or the API 425. In some embodiments, the query engine 415 may implement instructions for one or more configurator services that perform one or more operations of the method 1800.

The method 1800 includes operation 1802, wherein, based on a form of the query received in the method 1700 at operation 1702, the one or more processing devices may determine which conversion algorithm to use from a set of algorithms. The selection of the conversion algorithm may be based on an efficiency of the computing resource usage. For example, certain conversion algorithms may convert different forms of queries using less computing resources (e.g., processing cycles, memory, etc.) than other conversion algorithms.

At operation 1804, the one or more processing devices may select different conversion algorithms for different portions of the query. For example, a first portion of the query may be converted using a first conversion algorithm based on a first form of the first portion of the query, and a second portion of the query may be converted using a second conversion algorithm (different than the first conversion algorithm) based on a second form (different than the first form) of the query. The first and second conversion algorithms may be selected because they result in the least amount of computing resources consumed to conversion the query to a format that is processed by the query engine 415.

Figure 19:
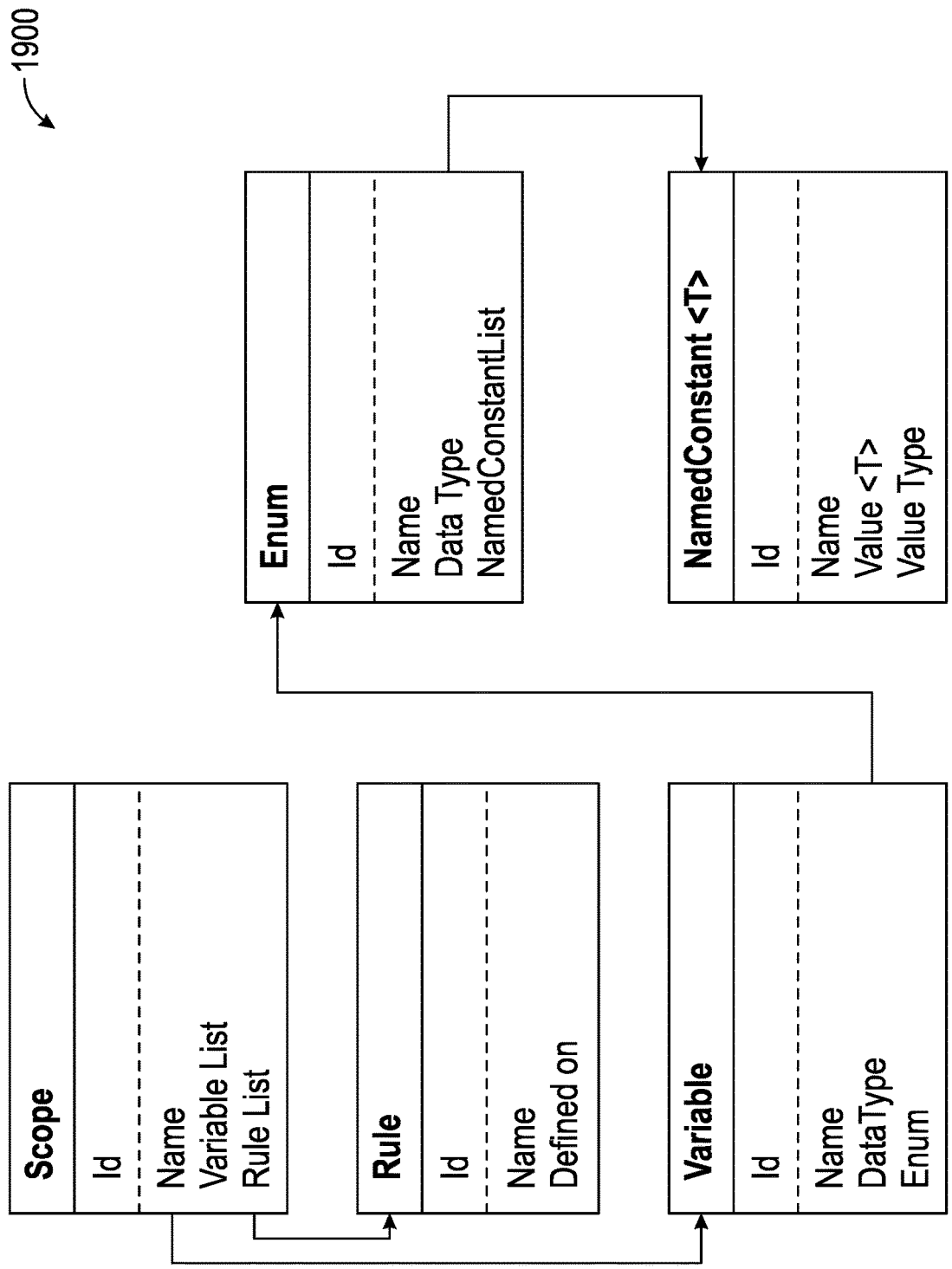
FIG. 19 illustrates an example scope object model according to embodiments of this disclosure.

FIG. 19 illustrates an example scope object model 1900 according to embodiments of this disclosure. The scope object may contain variables with a list of values that can be assigned to the variable and rules that define relationships between assigned variables. The scope object model 1900 may be configured to work with any item types included in the self-referencing data model. A scope may refer to a class. A scope object may be an instance of a scope and the scope object may include 2 sets of items to represent variability definition: 1) variables with a list of values and 2) rules that define constraints within scope variables. The scope object may be built by a processing device executing the configurator services at runtime via "builder" methods. The scope object is not persisted in memory. A rule may refer to a container for an expression. The rule may be associated with a name and a definition. A variable may refer to a container used to store the variable definition. An enum may refer to a container for the list of named constants (NamedConstantList). A named constant may refer to a container used to store the value definition. The named constant may contain the property name, value, and valuetype. The scope, rule, variable, enum, and named constants may be item types defined in the self-referencing data model. Each object includes an id and a name.

As depicted, the scope object points to a list of rule objects (RuleList) and a list of variable objects (VariableList). The variable object includes a DataType and an Enum reference to the enum object.

Figure 20:
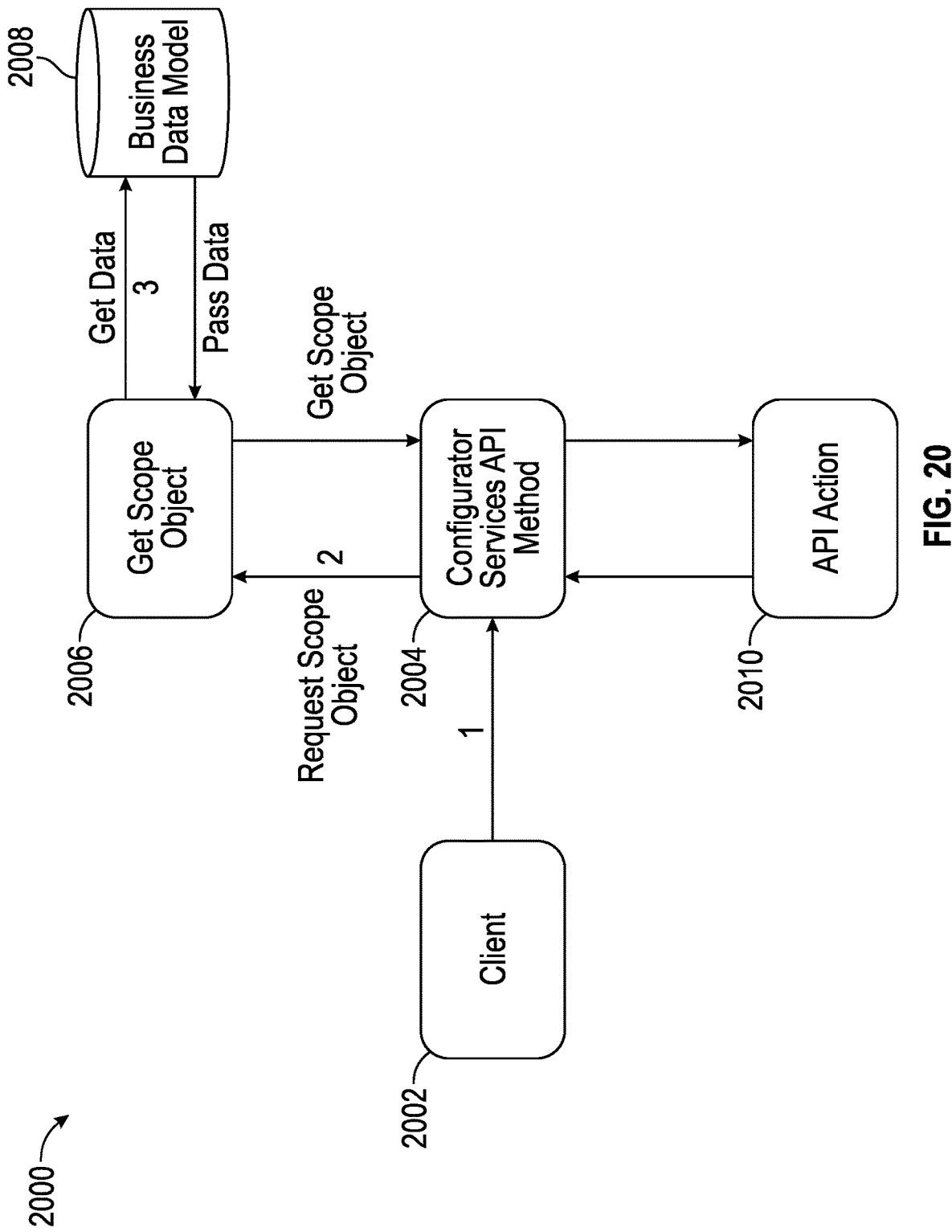
FIG. 20 illustrates an example configuration application programming interface method workflow according to embodiments of this disclosure.

FIG. 20 illustrates an example configuration application programming interface method workflow 2000 according to embodiments of this disclosure. The workflow 2000 provides a high-level outline of interactions of the front end 420 (e.g., "client" 2002 in FIG. 20). The client 2002 may receive a query from a user and the query may be transmitted to a configurator services API method 2004 that operates at the backend 410 or at a server separate from the backend 410. The configurator services API method 2004 may execute a method that requests a scope object be built. A scope builder method 2006 may requests data from a business data model 2008. The scope builder method 2006 collects and parses data from the business data model 2008. In some embodiments, the scope builder method 2006 may refer to a server method that uses a predefined method template. The template may enable customers to implement a scope builder method. Configurator services API methods that perform actions in the context of scope may be parameterized with the scope object. The following is an example of the method template:

2200 is "Rear Derailleur". The scope object 2200 includes relationships. For example, one relationship comprises an item having type "Variable" and name "Derailleur Material". This Variable includes a relationship for an item having type "NamedConstant" and name "Aluminum" and another item having type "NamedConstant" and name "Carbon Fiber". As depicted, there is another relationship item having name "Cogs Combinations".

In FIG. 23, the scope object 2200 is continued and includes a list of items having type "Rule". Each rule item type has a definition that defines a Boolean expression that contains the free-form Boolean expression language based on AML. In some embodiments, these Boolean expressions may be preconfigured by an entity associated with a product being configured. The Boolean expressions may be retrieved from the data model of the entity and may be included in the rule item types in the scope object 2200 during runtime. It should be noted that the scope object 2200 is not persisted in memory.

The scope object 2200 may be used by a processing device executing the API 423 and/or a processing device of the backend 410 during runtime to retrieve valid combinations of variables (e.g., items) based on rules set in the scope object 2200 from the business data model 2008. The valid combinations may be included in a solution space and presented to the user via a user interface of the frontend 420. In some embodiments, invalid combinations of variables (e.g., items) may be determined and presented.

Returning to FIG. 20, the configurator services API method 2004 may perform an API action 2010 in the context of the built scope object. The API action 2010, in one example, may include obtaining the next set of valid combination of items. The API action 2010 may be iteratively performed to continue to use the rules that specify constraints and logic for determining valid combinations of items and/or identifying a desired item. The rules may be implemented as IF THEN statements in some instances. The rules may be implemented in Boolean expressions in some instances. In some embodiments, the rules may be implemented as a combination of Boolean algebra and IF THEN statements (conditional logic).

The API action 2010 may determine conflicts of why certain items cannot be validly combined and the solution space may present the one or more reasons, according to the rules, of why those items cannot be combined.

```
<Item type="Method" action="%action name%" %specific API attributes%>
    <targetScope>
        <Item type="Method" action="%builder method name%" %builder method attributes %>
            %builder method properties%
        </Item>
    </targetScope>
    %specific API properties%
</Item>
```

The scope builder method 2006 may enable generating a scope object and caching the scope object. In some embodiments a scope resolver may include a module that is used as part of the scope builder process. The scope resolver may parse the request AML, call for the scope builder method, and cache the scope builder method result.

The scope builder method 2006 generates a scope object 2200, as depicted in FIGS. 22 and 23.

The scope object 2200 is represented in XML. As depicted, the scope object 2200 is an item having an item type of "Scope" and an id. The name of the scope object The configurator services API may include several methods. The configuration services described herein works with any custom business model and is therefore data model agnostic. The scope builder method may take any customer data and translate it into a scope object that is used by the configurator services API. The scope object is used by the configurator services API to solve the appropriate task.

cfg_GetScopeStructure is an API method that uses the scope object. This method creates a representation of the scope object: it uses scope_builder to build the scope object, which may then be serialized into either AML or JSON. This method is used to display a list of available choices, get actual data inside implementation of new server methods, and/or for debugging purposes.

cfg_GetValidCombinations is an API method that uses the scope object. This method may find a list of valid combinations of items (e.g., parts). Valid combination is a set of variables with assigned values to them, which leads to a valid combination to be presented in a solution space. This method may be used to find all valid combinations, find at least one valid combination, validate the current scope object, validate values selected for variables, validate an expression, etc.

cfg_ValidateScope is an API method that uses the scope object. This method validates if the scope object has at least one valid combination and/or if each value can be assigned to a variable for at least one valid combination. This method may be used to find out if the specified scope object is solvable and/or determine if unreachable values exist.

cfg_GetIntersectingExpressions is an API method that uses the scope object. This method may find intersections of expressions. Expressions may intersect if the scope object has at least one valid combination with specified expressions applied.

Cfg_GetConflicts is an API method that uses the scope object. This method finds reasons why the current scope object is unsolvable. This method may get data that describes reasons for the conflicts and/or debug why there is no solution space with a valid combination.

FIG. 21 illustrates a free-form Boolean expression language 2100 according to embodiments of this disclosure. The free-form Boolean expression language 2100 may be used to define restrictions and relationships between variables. The free-form Boolean expression language 2100 may be based on AML and may use various nodes in the language, such as expression, eq, variable, named-constant, and, or, not, implication, condition, consequence, exactly-one, at-most-one, at-least-one. In some embodiments, a Boolean expression may be represented as a value of a container node by wrapping it with CDATA or encoding it.

An expression node may be a root node that represents the expression. For example,

```
<expression>
  <and>
    <eq>
      <variable id="item_id_color" />
      <named-constant id="item_id_red" />
    </eq>
    <eq>
      <variable id="item_id_wheelsize" />
      <named-constant id="item_id_17inch" />
    </eq>
  </and>
</expression>
```

The above example represents the Boolean expression for Color=Red AND WheelSize=17 inch.

The <eq> node may define equivalence. The <variable> node defines a variable element and may be used to define the first part of an equivalence and the <named-constnt> node defines the named-constant element and may be used to define the second part of equivalence. The named-constant may represent the value of the variable with which the named-constant is associated. The <implication> node defines a Boolean operation "implication" for example "if Color=Red then WheelSize=17 inch". This node may include the <condition> and <consequence> child nodes.

The free-form Boolean expression language 2100 depicts an implication node including a condition node and a consequence node. The condition node includes an expression term node ("eq") having a variable node and a named-constant node. The expression term class describes connection between variable and value with the <eq> operator. For example, <eq><variable id="color_id"/><named-constant id="red_color_id"/></eq>. The variable node includes an id ("item_id_bicycletype") and the named-constant node includes an id ("item_id_Mountain").

The consequence node includes an eq node having a variable node and a named-constant node. The variable node includes an id ("item_id_material"), and the named-constant node includes an id ("item_id_AluminumAlloy).

In some embodiments, the Boolean expressions may be in conjunctive normal form (CNF) and/or disjunctive normal form (DNF). The CNF may refer to a product of sums or an AND of ORs. The DNF may refer to a sum of products or an OR of ANDs.

An example of the CNF may be represented as: (Red OR Green OR Blue) AND (Small OR Medium OR Large) AND (Stainless Stell OR Titanium). An example of the DNF may be represented as: (Red AND Small AND Titanium) OR (Red AND Medium AND Titanium). Examples of Boolean expression using the free-form Boolean expression language may be represented as: 1) Red AND (Small OR Medium OR Large) AND Titanium; 2) Green AND (Medium OR Large) AND NOT Stainless Steel; 3) IF Green THEN ((Medium OR Large) AND Titanium). Accordingly, in some embodiments, complex nested Boolean expressions may be generated in CNF. As depicted, the Boolean expression may be a rule (IF Green THEN ((Medium OR Large) AND Titanium).

In some embodiments, a processing device executing the configurator services may receive a query in AML format and convert the format to the free-form Boolean expressions to CNF to use MiniSAT, for example. In some embodiments, the processing device may receive the query as free-form Boolean expressions. The query may be input at the front end 420 and the front end 420 may transmit the query to the backend 410 and/or the APIs 425. The query may request a number of valid combinations of certain items (e.g., items) for a product (e.g., vehicle). In some embodiments, the query may request a certain configuration of parts and the output may indicate whether the configuration is valid or invalid.

In some embodiments, various conversion algorithms may be selected from based on a form of the free-form Boolean expression. For example, forms having certain elements (e.g., AND, OR) may be converted using a first conversion algorithm and forms having other elements (e.g., NOT, IF, THEN) may be converted using a second conversion algorithm. The selection may be made based on which conversion algorithm consumes less resources for the form of a portion of the Boolean expression than another conversion algorithm for that form.

An example conversion algorithm may be Tseytin-based and uses Boolean algebra rules and laws, such as De Morgan. Another example conversion algorithm may be a Heuristic converter. The conversion algorithms may include a combination of Boolean algebra rules and laws, macro-operators, rules, and/or constraints pertaining to the self-referencing data model. The configurator services may determine which of the conversion algorithms to use for a Boolean expression based on condition evaluation for best performance. The Tseytin-based algorithm uses different Boolean algebra rules and laws on different parts of the Boolean expression. The Tseytin-based conversion algorithm may receive a Boolean expression as input and produces a Boolean formula in CNF, which can be solved by a CNF-SAT solver.

The Tsceytin-based conversion algorithm may output a formula that is a conjunction of sub-expressions where the satisfaction of each sub-expression enforces the proper operation of a single operation in the Boolean expression. The satisfaction of the entire output expression thus enforces that the entire input circuit is operating properly. In some instances, for each operation, a new variable representing its output may be introduced and a CNF expression that relates inputs and outputs is appended to the output expression.

FIGS. 22-23 illustrate an example extensible markup language output of a scope item according to embodiments of this disclosure.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

CLAUSES

1. A computer-implemented method for operating a product configuration service, wherein the method comprises:
   receiving a query pertaining to a scope of searching for a configuration of a product;
   retrieving, based on the query, information from a self-referencing data model that stores the information as one or more items having one or more item types, wherein the information comprises:
   one or more variables associated with an entity and values for the one or more variables defined by one or more files of the entity, wherein the one or more variables are defined by one or more features that are linked to a source of the one or more files,
   one or more rules that specify compatibility constraints between the one or more variables, and
   the information is used during runtime and not persisted to memory;
   generating, based on the one or more rules and the one or more variables, a solution space comprising the one or more values; and
   presenting the solution space in a user interface of a computing device of a user.

2. The method of any clause herein, wherein the user interface includes one or more indications of whether a combination of the values are compatible with each other or are not compatible with each other.

3. The method of any clause herein, further comprising using an application programming interface (API) to interact with the computing device of the user, wherein the API is hosted by a server external to the computing device.

4. The method of any clause herein, wherein the self-referencing data model is agnostic to a type of data model associated with the one or more files of the entity.

5. The method of any clause herein, further comprising generating an expression using a free-form Boolean expression language including a nested structure.

6. The method of any clause herein, further comprising, based on a form of the query, determining which conversion algorithm to use from a plurality of algorithms, wherein the selection of the conversion algorithm is based on an efficiency of the computing resource usage.

7. The method of any clause herein, further comprising selecting different conversion algorithms for different portions of the query.

8. A tangible, non-transitory computer-readable medium storing instructions that, when executed, cause a processing device to:
   receive a query pertaining to a scope of searching for a configuration of a product;
   retrieve, based on the query, information from a self-referencing data model that stores the information as one or more items having one or more item types, wherein the information comprises:
   one or more variables associated with an entity and values for the one or more variables defined by one or more files of the entity, wherein the one or more variables are defined by one or more features that are linked to a source of the one or more files,
   one or more rules that specify compatibility constraints between the one or more variables, and
   the information is used during runtime and not persisted to memory;
   generating, based on the one or more rules and the one or more variables, a solution space comprising the one or more values; and
   presenting the solution space in a user interface of a computing device of a user.

9. The computer-readable medium of any clause herein, wherein the user interface includes one or more indications of whether a combination of the values are compatible with each other or are not compatible with each other.

10. The computer-readable medium of any clause herein, wherein the processing device is further to use an application programming interface (API) to interact with the computing device of the user, wherein the API is hosted by a server external to the computing device.

11. The computer-readable medium of any clause herein, wherein the self-referencing data model is agnostic to a type of data model associated with the one or more files of the entity.

12. The computer-readable medium of any clause herein, wherein the processing device is further to generate an expression using a free-form Boolean expression language including a nested structure.

13. The computer-readable medium of any clause herein, wherein the processing device is further to, based on a form of the query, determine which conversion algorithm to use from a plurality of algorithms, wherein the selection of the conversion algorithm is based on an efficiency of the computing resource usage.

14. The computer-readable medium of any clause herein, wherein the processing device is further to select different conversion algorithms for different portions of the query.

15. A system comprising:
   a memory device storing instructions; and
   a processing device communicatively coupled to the memory device, and the processing device executes the instructions to:
   receive a query pertaining to a scope of searching for a configuration of a product;
   retrieve, based on the query, information from a self-referencing data model that stores the information as one or more items having one or more item types, wherein the information comprises:
   one or more variables associated with an entity and values for the one or more variables defined by one or more files of the entity, wherein the one or more variables are defined by one or more features that are linked to a source of the one or more files, one or more rules that specify compatibility constraints between the one or more variables, and the information is used during runtime and not persisted to memory;

generating, based on the one or more rules and the one or more variables, a solution space comprising the one or more values; and presenting the solution space in a user interface of a computing device of a user.

16. The system of any clause herein, wherein the user interface includes one or more indications of whether a combination of the values are compatible with each other or are not compatible with each other.

17. The system of any clause herein, wherein the processing device is further to use an application programming interface (API) to interact with the computing device of the user, wherein the API is hosted by a server external to the computing device.

18. The system of any clause herein, wherein the self-referencing data model is agnostic to a type of data model associated with the one or more files of the entity.

19. The system of any clause herein, wherein the processing device is further to generate an expression using a free-form Boolean expression language including a nested structure.

20. The system of any clause herein, wherein the processing device is further to, based on a form of the query, determine which conversion algorithm to use from a plurality of algorithms, wherein the selection of the conversion algorithm is based on an efficiency of the computing resource usage.

What is claimed is:

1. A computer-implemented method for operating a product configuration service, wherein the method comprises:

receiving a query pertaining to a scope of searching for a configuration of a product;

based on a form of the query, determining one or more conversion algorithms to use from a plurality of algorithms, wherein different conversion algorithms are selected for different elements in the form of the query;

converting, using the one or more conversion algorithms, the query from the form to a second form to generate a converted query;

retrieving, based on the converted query, information from a self-referencing data model that stores the information as one or more items having one or more item types, wherein the information comprises:

one or more variables associated with an entity and values for the one or more variables defined by one or more files of the entity, wherein the one or more variables are defined by one or more features that are linked to a source of the one or more files, one or more rules that specify compatibility constraints between the one or more variables, and the information is used during runtime and not persisted to memory;

generating, based on the one or more rules and the one or more variables, a solution space comprising the one or more values; and presenting the solution space in a user interface of a computing device of a user.

2. The computer-implemented method of claim 1, wherein the user interface includes one or more indications of whether a combination of the values are compatible with each other or are not compatible with each other.

3. The computer-implemented method of claim 1, further comprising using an application programming interface (API) to interact with the computing device of the user, wherein the API is hosted by a server external to the computing device.

4. The computer-implemented method of claim 1, wherein the self-referencing data model is agnostic to a type of data model associated with the one or more files of the entity.

5. The computer-implemented method of claim 1, further comprising generating an expression using a free-form Boolean expression language including a nested structure.

6. The computer-implemented method of claim 1, wherein the selection of the one or more conversion algorithms is based on an efficiency of the computing resource usage.

7. A tangible, non-transitory computer-readable medium storing instructions that, when executed, cause a processing device to:

receive a query pertaining to a scope of searching for a configuration of a product;

based on a form of the query, determine one or more conversion algorithms to use from a plurality of algorithms, wherein different conversion algorithms are selected for different elements in the form of the query;

convert, using the one or more conversion algorithms, the query from the form to a second form to generate a converted query;

retrieve, based on the converted query, information from a self-referencing data model that stores the information as one or more items having one or more item types, wherein the information comprises:

one or more variables associated with an entity and values for the one or more variables defined by one or more files of the entity, wherein the one or more variables are defined by one or more features that are linked to a source of the one or more files, one or more rules that specify compatibility constraints between the one or more variables, and the information is used during runtime and not persisted to memory;

generating, based on the one or more rules and the one or more variables, a solution space comprising the one or more values; and presenting the solution space in a user interface of a computing device of a user.

8. The non-transitory computer-readable medium of claim 7, wherein the user interface includes one or more indications of whether a combination of the values are compatible with each other or are not compatible with each other.

9. The non-transitory computer-readable medium of claim 7, wherein the processing device is further to use an application programming interface (API) to interact with the computing device of the user, wherein the API is hosted by a server external to the computing device.

10. The non-transitory computer-readable medium of claim 7, wherein the self-referencing data model is agnostic to a type of data model associated with the one or more files of the entity.

11. The non-transitory computer-readable medium of claim 7, wherein the processing device is further to generate an expression using a free-form Boolean expression language including a nested structure.

12. The non-transitory computer-readable medium of claim 7, wherein the selection of the one or more conversion algorithms is based on an efficiency of the computing resource usage.

13. A system comprising:

a memory device storing instructions; and a processing device communicatively coupled to the memory device, and the processing device executes the instructions to:

receive a query pertaining to a scope of searching for a configuration of a product;

based on a form of the query, determine one or more conversion algorithms to use from a plurality of algorithms, wherein different conversion algorithms are selected for different elements in the form of the query;

convert, using the one or more conversion algorithms, the query from the form to a second form to generate a converted query;

retrieve, based on the converted query, information from a self-referencing data model that stores the information as one or more items having one or more item types, wherein the information comprises:

one or more variables associated with an entity and values for the one or more variables defined by one or more files of the entity, wherein the one or more variables are defined by one or more features that are linked to a source of the one or more files, one or more rules that specify compatibility constraints between the one or more variables, and the information is used during runtime and not persisted to memory;

generating, based on the one or more rules and the one or more variables, a solution space comprising the one or more values; and presenting the solution space in a user interface of a computing device of a user.

14. The system of claim 13, wherein the user interface includes one or more indications of whether a combination of the values are compatible with each other or are not compatible with each other.

15. The system of claim 13, wherein the processing device is further to use an application programming interface (API) to interact with the computing device of the user, wherein the API is hosted by a server external to the computing device.

16. The system of claim 13, wherein the self-referencing data model is agnostic to a type of data model associated with the one or more files of the entity.

17. The system of claim 13, wherein the processing device is further to generate an expression using a free-form Boolean expression language including a nested structure.

18. The system of claim 13, wherein the selection of the one or more conversion algorithms is based on an efficiency of the computing resource usage.

* * * * *